US012105222B2

(12) United States Patent
Dunn et al.

(10) Patent No.: US 12,105,222 B2
(45) Date of Patent: Oct. 1, 2024

(54) SYSTEMS AND METHODS FOR REDUCING COGNITIVE WORKLOAD AND ENERGY CONSUMPTION BY A SENSOR UTILIZED ON A VEHICLE

(71) Applicant: Harman International Industries, Incorporated, Stamford, CT (US)

(72) Inventors: Kevin Dunn, Fenton, MI (US); Dan DeClerck, Milford, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 877 days.

(21) Appl. No.: 17/102,212

(22) Filed: Nov. 23, 2020

(65) Prior Publication Data

US 2022/0163635 A1    May 26, 2022

(51) Int. Cl.
| | |
|---|---|
| G01S 7/481 | (2006.01) |
| B60R 11/00 | (2006.01) |
| B60R 11/04 | (2006.01) |
| G01S 17/86 | (2020.01) |
| G01S 17/931 | (2020.01) |

(52) U.S. Cl.
CPC ............ *G01S 7/4817* (2013.01); *G01S 17/86* (2020.01); *G01S 17/931* (2020.01); *B60R 2011/004* (2013.01); *B60R 11/04* (2013.01)

(58) Field of Classification Search
None
See application file for complete search history.

(56) References Cited

U.S. PATENT DOCUMENTS

| | | | |
|---|---|---|---|
| 10,282,074 B2* | 5/2019 | Murad | G06F 3/04845 |
| 2005/0057741 A1 | 3/2005 | Anderson et al. | |
| 2010/0165323 A1* | 7/2010 | Fiess | G01S 7/4817 356/3 |
| 2014/0204385 A1 | 7/2014 | Ouyang et al. | |
| 2015/0148986 A1* | 5/2015 | Shin | G01S 17/42 702/170 |
| 2018/0011173 A1* | 1/2018 | Newman | B60S 1/0818 |
| 2018/0113200 A1* | 4/2018 | Steinberg | G01S 7/486 |
| 2018/0329037 A1* | 11/2018 | Bozchalooi | G01S 7/4815 |
| 2020/0172120 A1* | 6/2020 | Pink | G01S 7/497 |
| 2020/0379089 A1* | 12/2020 | Morarity | G01S 17/42 |
| 2020/0379090 A1* | 12/2020 | Nothern, III | G01S 7/4815 |
| 2021/0011132 A1* | 1/2021 | Ellis | G01S 17/10 |
| 2021/0208251 A1* | 7/2021 | Smith | G01S 17/931 |

OTHER PUBLICATIONS

European Patent Office, Extended European Search Report Issued in Application No. 21209676.2, Apr. 22, 2022, Germany, 12 pages.

* cited by examiner

*Primary Examiner* — Yuqing Xiao
*Assistant Examiner* — Jempson Noel
(74) *Attorney, Agent, or Firm* — McCoy Russell LLP

(57) ABSTRACT

Systems and methods for imaging and ranging sensors that sense objects around a vehicle. In one example, a light detection and ranging (LIDAR) sensor including a plurality of microelectromechanical (MEMS) mirrors may be operated such that a functional field of view of the LIDAR sensor is adjusted by changing a number of MEMS mirrors that are operated to scan an external environment surrounding the vehicle. For example, one or more mirrors may be turned on or off depending on an intended vehicle path. In some examples, while all the MEMS mirrors are operated, overall processing of data may be reduced by using data acquired from the number of mirrors that scan the desired field of view.

19 Claims, 11 Drawing Sheets

FIG. 5

| CALCULATED VEHICLE PATH 502 | VEHICLE SPEED 504 | STEERING ANGLE 506 | LANE CHANGE INDICATION 508 | FIELD OF VIEW (FoV) 510 | NUMBER OF MEMS DEFLECTING MIRRORS POWERED ON 512 | ADJUSTMENT OF RIGHT MEMS AND LEFT MEMS 514 |
|---|---|---|---|---|---|---|
| 520 — Stopped at intersection, approaching or passing intersection, or turning at intersection or at vehicle start-up | | | | Full | Operate all MEMS mirrors to obtain full field of view | Operate all right and left MEMS mirrors |
| 522 — Straight or slightly curved | Vehicle speed < threshold | < second lower threshold | NO | Nominal FoV according to vehicle speed (Narrow FoV) | Number of MEMS mirrors less than total | Decrease right and left MEMS mirrors symmetrically |
| 524 — Straight or slightly curved | Vehicle speed > threshold | < second lower threshold | NO | Nominal FoV according to vehicle speed (Wider FoV) | Number of MEMS mirrors equal to less than total but greater than Narrow FoV | Increase right and left MEMS mirrors symmetrically |
| 526 — Straight or slightly curved | | < second lower threshold | YES | Increase FoV from nominal FoV in the direction of indication | Increase in direction of indication | Right indication–increase number of right MEMS while maintaining number of left MEMS<br>Left indication–Increase number of left MEMS while maintaining number of right MEMS |
| 528 — Curve | | ≥ second lower threshold and < first higher threshold | | Decrease FoV in the direction opposite to turning direction while maintaining current FoV in turning direction | Decrease a number of MEMS on a side opposite to turning direction while maintaining number of MEMS on the side of turn at nominal | Curve right - decrease number of left MEMS while maintaining number of right MEMS<br>Curve left – decrease number of right MEMS while maintaining number of left MEMS |
| 530 — Steep curve | | ≥ first higher threshold | | Decrease FoV in the direction opposite to turning direction while increasing FoV in the direction of turn | Decrease a number of MEMS on a side opposite to turning direction while increasing number of MEMS in the turning direction | Curve right - decrease number of left MEMS while increasing number of right MEMS<br>Curve left – decrease number of right MEMS while increasing number of left MEMS |
| 532 — Transient maneuvers | | | | Increase to full during transient and then adjust according to vehicle speed and/or calculated vehicle path | Operate all MEMS during transient and then adjust according to vehicle speed and/or calculated vehicle path | Operate all right and left MEMS mirrors and then adjust according to vehicle speed and/or calculated vehicle path |

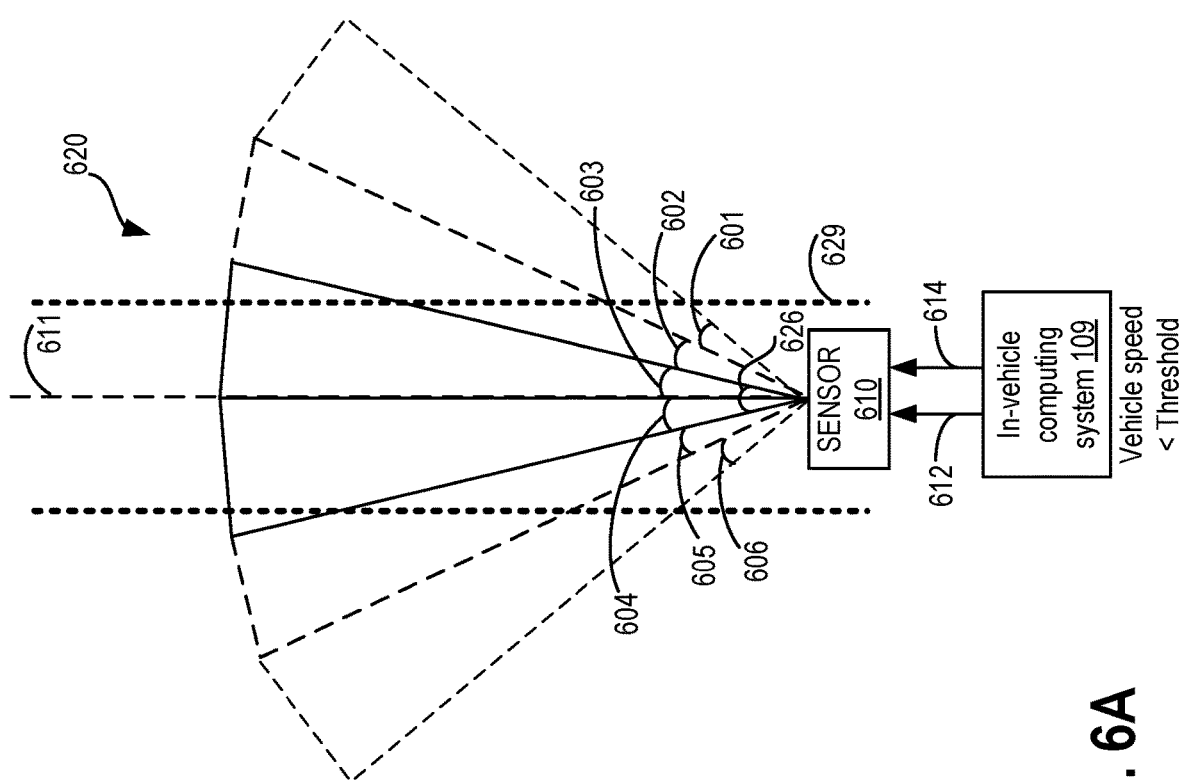
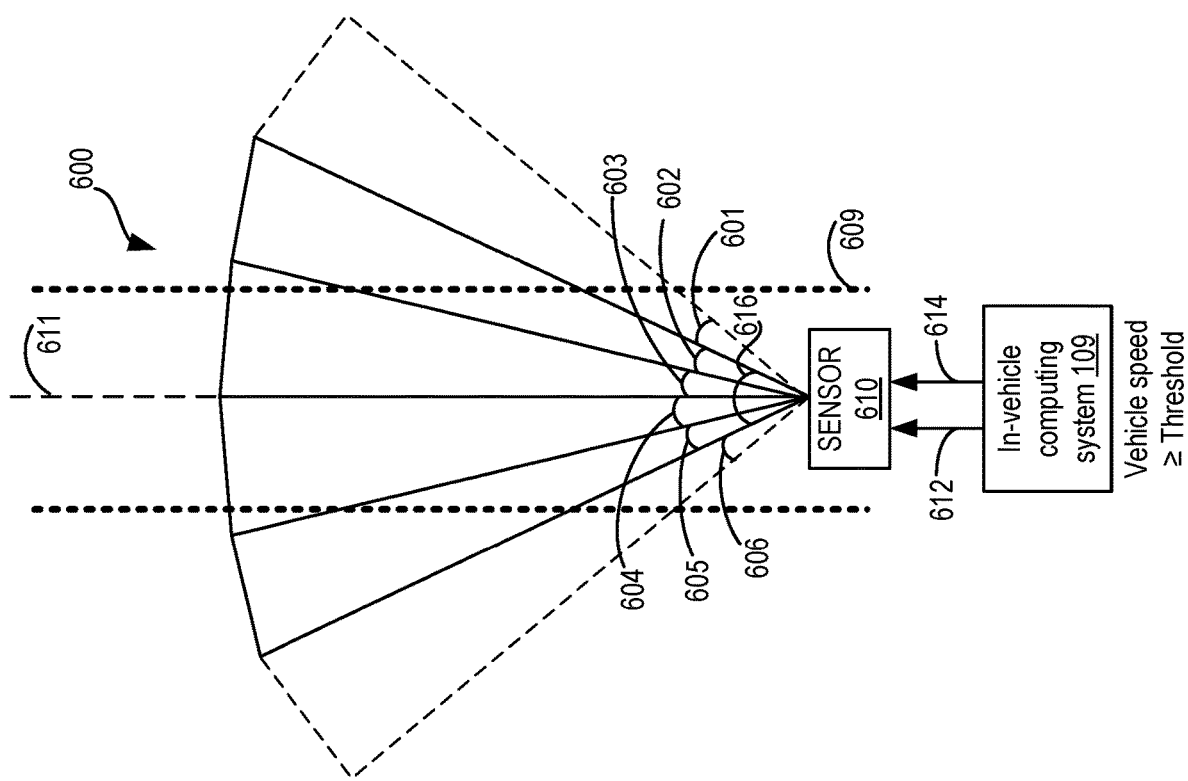
FIG. 6A

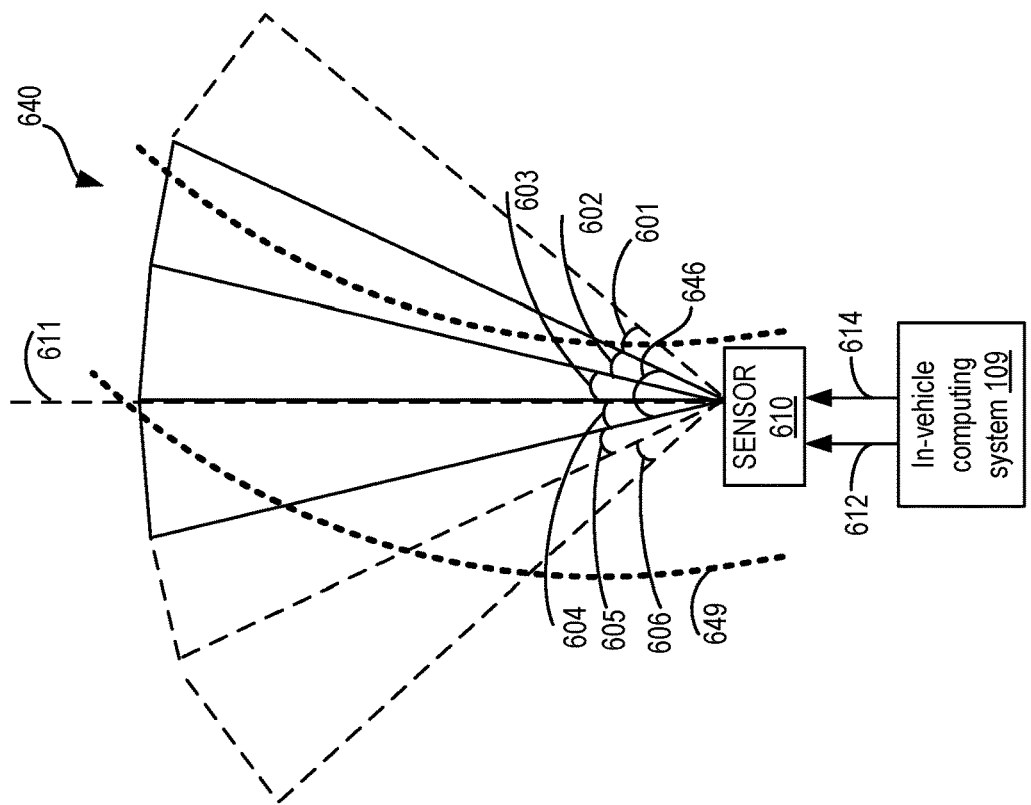
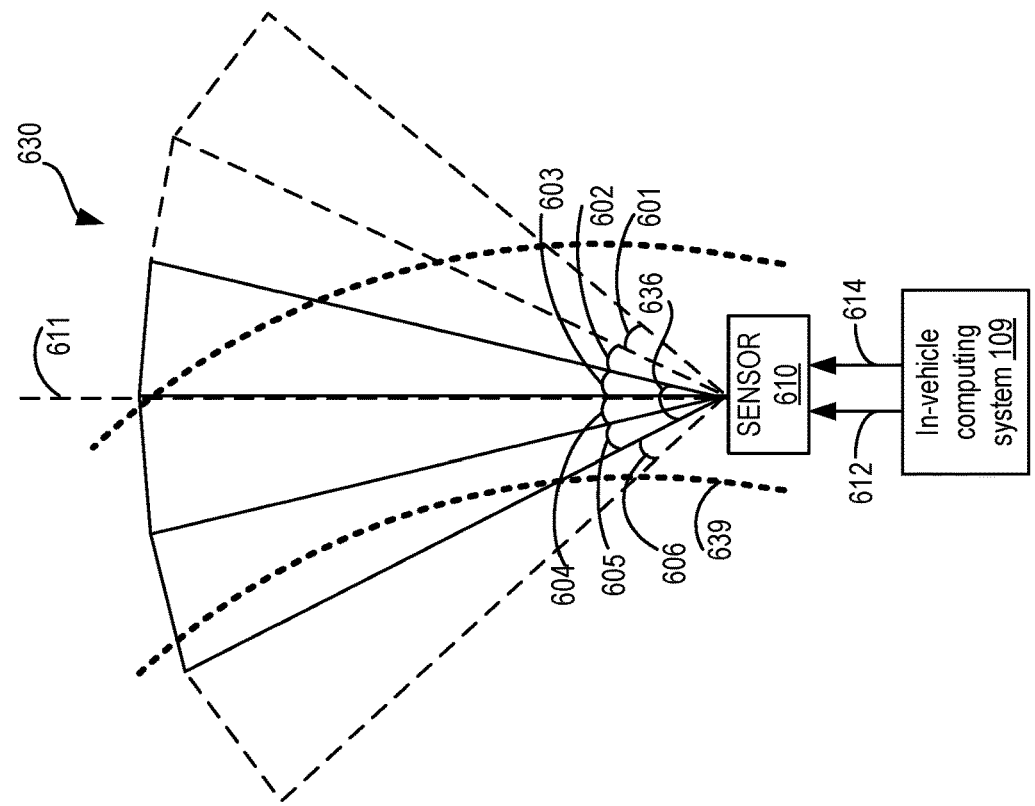
FIG. 6B

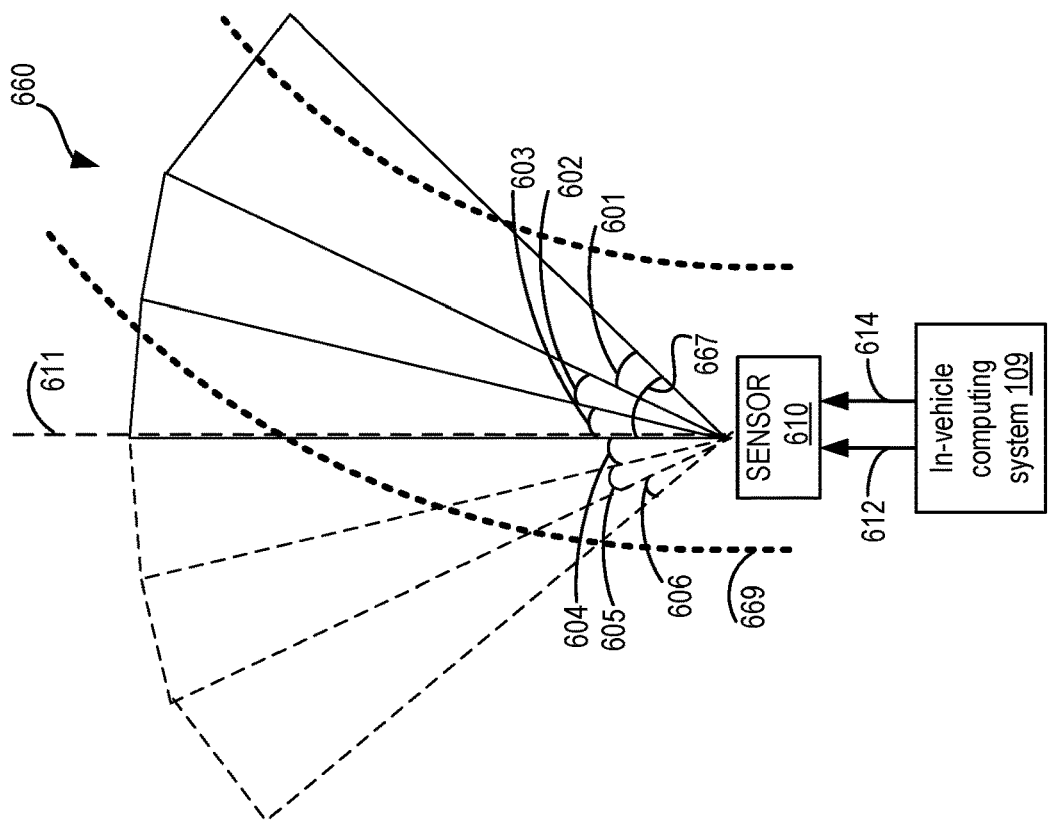
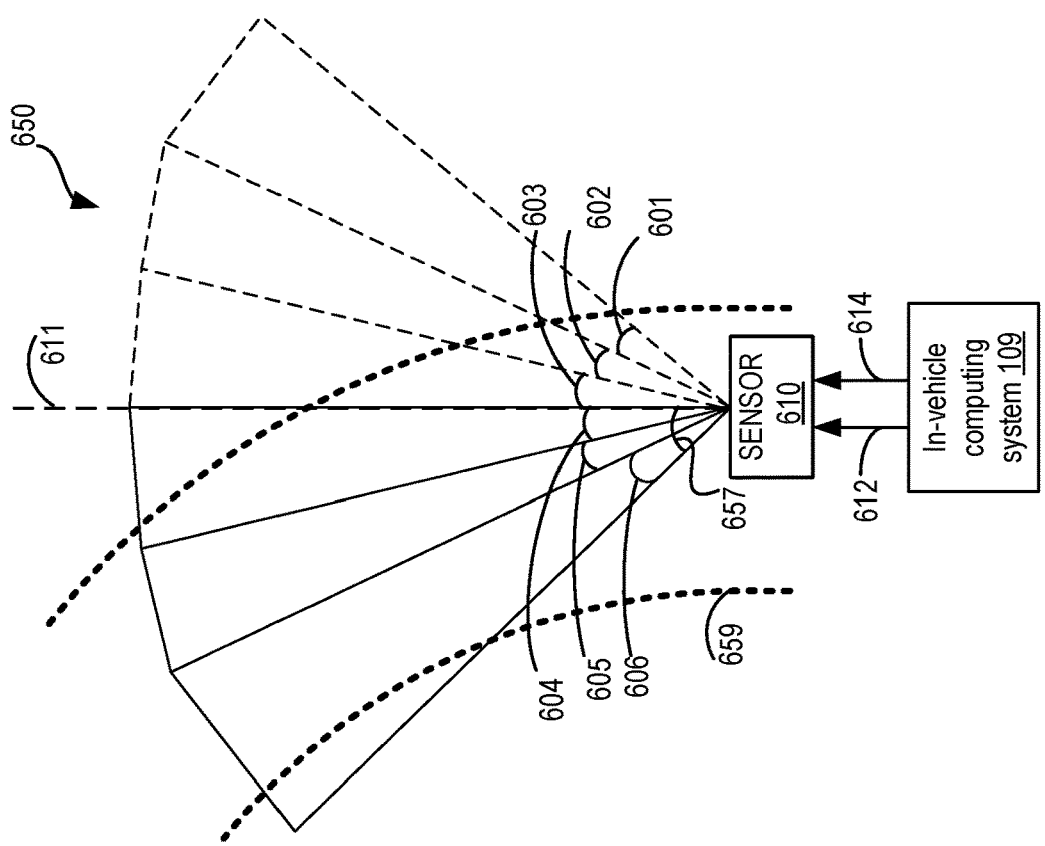
FIG. 6C

SYSTEMS AND METHODS FOR REDUCING COGNITIVE WORKLOAD AND ENERGY CONSUMPTION BY A SENSOR UTILIZED ON A VEHICLE

BACKGROUND

The disclosure generally relates to sensors for advanced driver assistance systems (ADAS) and/or autonomous system in a vehicle, and more particularly relates to sensors for sensing an environment surrounding the vehicle.

SUMMARY

Light detection and ranging (LIDAR) technology uses time of flight measurements using light to measure distance to an object. For example, a LIDAR based sensor system illuminates an object with light from a light source (e.g., laser), detects reflected light from the object, and measures an elapsed time between transmission of the light and detection of the reflected light to calculate the distance to the object. LIDAR sensors are deployed in automotive systems for sensing an environment surrounding a vehicle, and may be used along with camera vision and RADAR based sensors, to provide driver assistance and/or enable various levels of automation to the vehicle.

LIDAR sensor systems that are employed for detecting objects at longer distances including scanning mechanisms for scanning a field of view. Therein, the LIDAR sensor system includes a deflector unit that diverts a collimated beam from the source to the object such that a small area of the object is illuminated, and the reflected light from the small area is sensed by a detector (e.g., a photo diode). The collimated beam is then moved (e.g., in a pre-determined pattern) to scan the field of view, and detected reflections may be used to generate a depth map of the vehicle environment.

One example scanning mechanism includes a plurality of Micro-Electro-Mechanical Systems (MEMS) mirrors that are operated by a MEMS mirror driver ASIC that senses, actuates, and control movement of the MEMS mirrors. In a light receiving path, photodiodes, receiver circuits, and hardware-accelerated signal processing units are implemented to receive the light reflected from the objects, and process the sensor data.

MEMS mirrors have a limited field of view (e.g., in acute angles) and therefore, in order to expand the field of view, larger arrays of MEMS mirrors may be used to scan a wider field of view. This increases power consumption by the LIDAR system. Further, to compute a robust depth map (e.g., 3D point cloud) from the raw sensor data, a huge amount of computational and power resources (e.g., for signal processing by hardware-accelerated units) may be spent. Higher power consumption by the various components (e.g., driving, sensing, and processing mechanisms) of the LIDAR systems may have an impact on an operating range of vehicles that rely fully or partly on electric propulsion systems.

Some vehicle systems, additionally or alternatively to scanning LIDAR systems indicated above, may employ one or more non-scanning LIDAR systems, such as flash LIDAR systems. Therein, a single large-area laser pulse illuminates the environment in front of it and the reflected light is captured via photodetectors. However, flash LIDAR systems require high peak laser power to illuminate the large area. The power requirements are further increased when multiple flash LIDAR systems are employed to increase a total field of view.

The inventors have recognized the above-mentioned issues and have further recognized that during some vehicle operating conditions, multiplicity of MEMS mirrors are operated that scan an environment that is not relevant to the vehicle's intended driving path, and thus, valuable resources are spent (e.g., computational resources and electrical power) in scanning, sensing, and processing out-of-path objects. Similarly, when multiple flash LIDAR systems are employed, areas in the vehicle environment that are not relevant to vehicle's intended path may be scanned by one or more flash LIDARs, thereby increasing resource consumption.

The inventors have developed systems and methods to at least partially address the above issues. In one example, a method for a vehicle may comprise adjusting a field of view of a LIDAR sensor mounted on the vehicle by adjusting a number of MEMS mirrors operated with electrical power; wherein the field of view is adjusted according to one or more of a vehicle speed and an intended vehicle path.

As an example, when the vehicle speed is less than a threshold speed, a narrower field of view may be used to scan the environment by using a fewer number of MEMS mirrors to illuminate the objects in the environment. However, when the vehicle speed is greater than the threshold speed, in order to ensure sufficient reaction time for the sensor to detect objects that enter the vehicle path, a wider field of view may be used for scanning by using a greater number of MEMS for scanning. Similarly, when the vehicle's intended path (e.g., based on a steering angle of a steering wheel and/or according to information from the vehicle's navigation system) indicates a curved path, some of the MEMS mirrors that are configured to scan an environment that is not in the intended vehicle path or within a threshold region surrounding the intended vehicle path (e.g., in a region opposite to the intended direction of turn of the vehicle) may be unpowered.

In another example, when a plurality of flash LIDAR systems are used, one or more LIDAR systems (among the plurality of LIDAR systems) that scan an environment outside the intended vehicle path and/or outside the threshold region surrounding the intended vehicle path may be not be operated.

In this way, the sensors components are adapted to sense, process and act upon the pertinent environment around a vehicle dependent on the intended motion or its path. This optimizes the power consumed by the sensor to sense and process areas pertinent to the intended path of a vehicle. For example, by reducing a number of MEMS mirrors to scan the environment and/or reducing a number of LIDAR units that are operated, overall electrical power consumed by the LIDAR sensor system may be reduced. Further, cognitive workload with respect to ASIC driver processing (in the light emitter path) and signal processing (in the receiver path) may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows an example table illustrating various adjustments of a functional field of view of a LIDAR system during vehicle operation in accordance with one or more embodiments of the present disclosure; and FIGS. 6A-6C illustrate example adjustments of a functional field of view of a LIDAR system according to one or more of a vehicle speed and an intended vehicle path in accordance with one or more embodiments of the present disclosure.

DETAILED DESCRIPTION

Figure 1A:
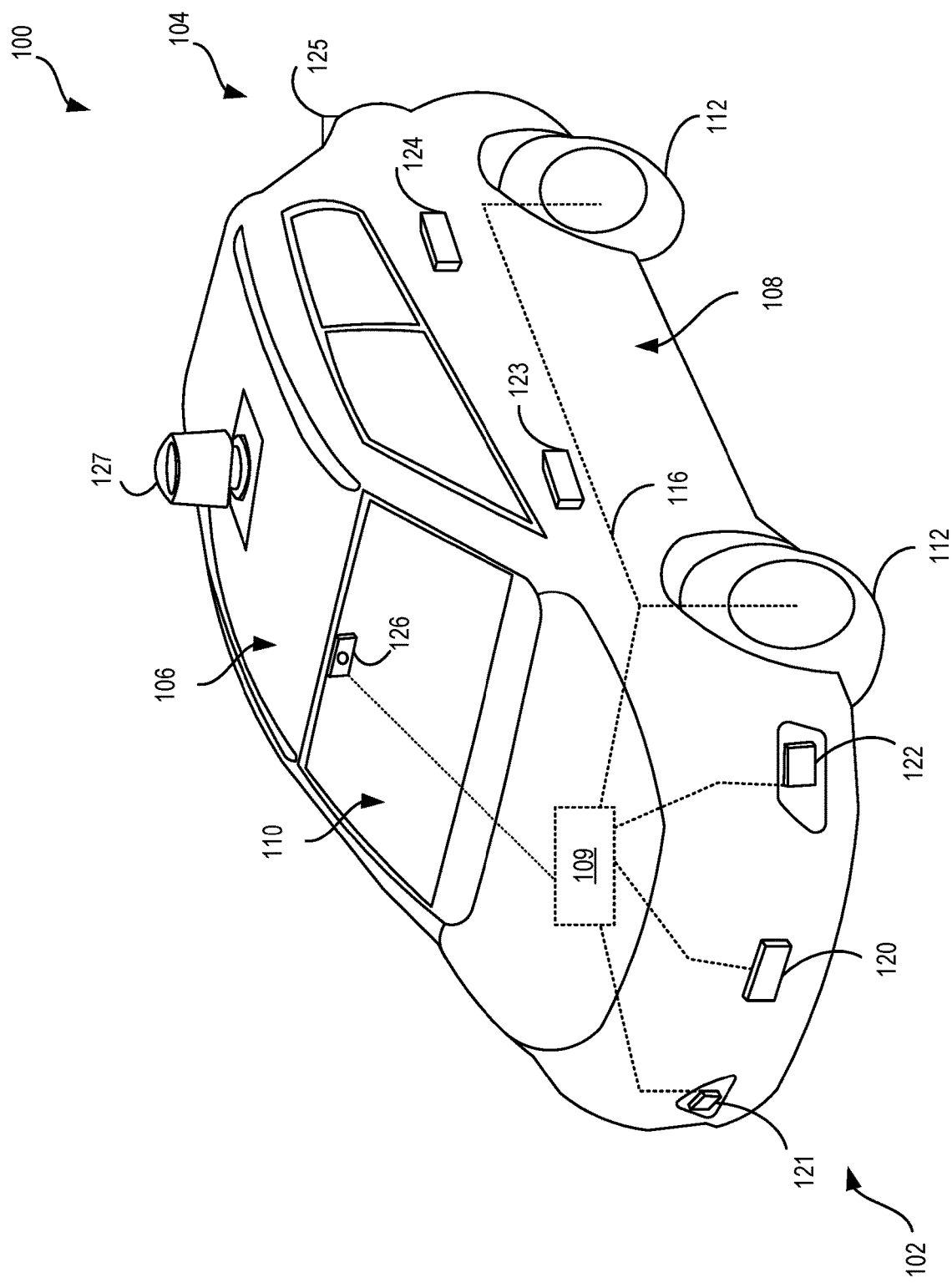
FIG. 1A shows a perspective view of an example vehicle including one or more sensor systems in accordance with one or more embodiments of the present disclosure.

The present disclosure relates to adjusting operation of one or more sensors, such as imaging and ranging sensors that may be used to detect and/or identify objects in an external environment surrounding a vehicle. For example, a vehicle system, such as shown in FIG. 1A, may include an in-vehicle computing system, such as shown in more detail in FIG. 1B and one or more sensors for evaluating the external environment of the vehicle communicatively coupled to the in-vehicle computing system. The in-vehicle computing system in coordination with respective processors of the one or more sensor systems and using indications from one or more sensors evaluating vehicle operation (e.g., vehicle speed, steering angle, etc.) may adjust operation of the one or more sensors, as described at FIG. 3. The one or more sensors may be configured as LIDAR sensors, such as LIDAR sensor show at FIG. 2A, which may include one or more deflectors for projecting light towards the external environment of the vehicle to illuminate objects within a field of view of the LIDAR sensor. Reflected light from the objects is then received by the LIDAR sensor and used to evaluate the externa operating environment of the vehicle. Some LIDAR sensors may include a plurality of MEMS mirrors as deflectors for scanning within the field of view, as shown in FIG. 2B. During vehicle operation, a functional field of view of a LIDAR sensor may be increased or decreased by adjusting a number of deflector units or MEMS mirrors operated, according to the methods described at FIGS. 4A and 4B, to improve energy consumption and computational workload. Non-limiting examples of various functional field of view adjustments and the corresponding deflector units or MEMS mirror adjustments to achieve the desired functional field of view are shown in FIG. 5. FIGS. 6A-6C illustrate the functional field of view adjustments that may be performed according to vehicle speed and/or an intended vehicle path. For example, during some operating conditions, such as during low vehicle speeds and/or when the vehicle's calculated vehicle path has a curvature greater than a threshold curvature, one or more deflector units or MEMS mirrors that scan an out-of-path environment may not be operated to reduce power consumption by the sensor system. As a result, an amount of data acquired by the sensor system is also reduced, which reduces computational workload for the associated processor.

In this way, by reducing a number of sensor subunits through which redundant and/or out-of-path information is acquired during certain vehicle operating conditions, the technical effect of improved power conservation can be achieved. Consequently, power management and computational workload management can be improved.

FIG. 1 shows an example vehicle 100 comprising a plurality of sensor systems 120-127 that may be a part of one or more advanced driver assistance systems (ADAS) associated with vehicle 100. In some embodiments, the plurality of sensor systems 120-127 may be used in combination with other systems of vehicle 100 to provide various levels of driving autonomy.

Vehicle 100 comprises a vehicle front 102, a vehicle rear 104, at least one vehicle side 108, and a vehicle cabin 110. In one example, as shown, vehicle 100 may be a motor vehicle including drive wheels 112 and a propulsion system. The propulsion system may be controlled at least partially by an in-vehicle computing system 109 including a controller and by input from a vehicle operator via an input device (e.g., accelerator pedal). Vehicle 100 may be a road automobile, among other types of vehicles. In some examples, vehicle 100 may include a hybrid propulsion system with multiple sources of torque available to vehicle wheels 112. The hybrid propulsion system may include an energy conversion device operable to absorb energy from vehicle motion and/or an engine and convert the absorbed energy to an energy form suitable for storage by an energy storage device. In some examples, vehicle 100 may be a fully electric vehicle, incorporating fuel cells, solar energy capturing elements, and/or other energy storage systems for powering the vehicle.

Plurality of sensor systems 120-127 may be configured for identifying and/or detecting a vehicle path ahead of vehicle 100, as well as objects such as cars, pedestrians, obstacles, road signs, traffic signs, traffic lights, potholes, speed bumps etc. in the vicinity of vehicle 100. Plurality of sensor systems 120-127 may be RADAR sensors, LIDAR sensors, LADAR sensors, ultrasonic sensors, machine vision cameras, as well as position and motion sensors, such as accelerometers, gyroscopes, inclinometers, and/or other sensors, or any combination thereof.

In one embodiment, a first sensor system 120 and/or a second sensor system 127 of plurality of sensor systems 120-127 may be configured as ranging and imaging sensor systems (e.g., LIDAR systems). In one example, first sensor system 120 may be positioned at vehicle front 102, and second sensor system 127 may be mounted on to a vehicle roof 106. Further, a third sensor system 121, a fourth sensor system 122, a fifth sensor system 123, a sixth sensor system 124, and a seventh sensor system 125 of plurality of sensor systems 120-127 may be configured as radio object detection and ranging sensor systems (e.g., RADAR, RF), ultrasonic sensor systems, or other object detection systems, or any combination thereof. In one example, third and fourth sensor systems 121 and 122 are positioned at vehicle front 102, fifth and sixth sensor systems 123 and 124 are positioned at vehicle side 108, and seventh sensor system 125 is positioned at vehicle rear 104. Furthermore, the plurality of sensor systems may include at least one imaging sensor system 226 (e.g., machine vision camera, IR) coupled to vehicle front 102 and looking ahead of vehicle 100. While shown associated with one or more areas of vehicle 100, it should be appreciated that any of the sensor systems 120-127 may be coupled to or mounted on any part of vehicle 100 (e.g., a frame, a body panel, a compartment, etc.).

Figure 2A:
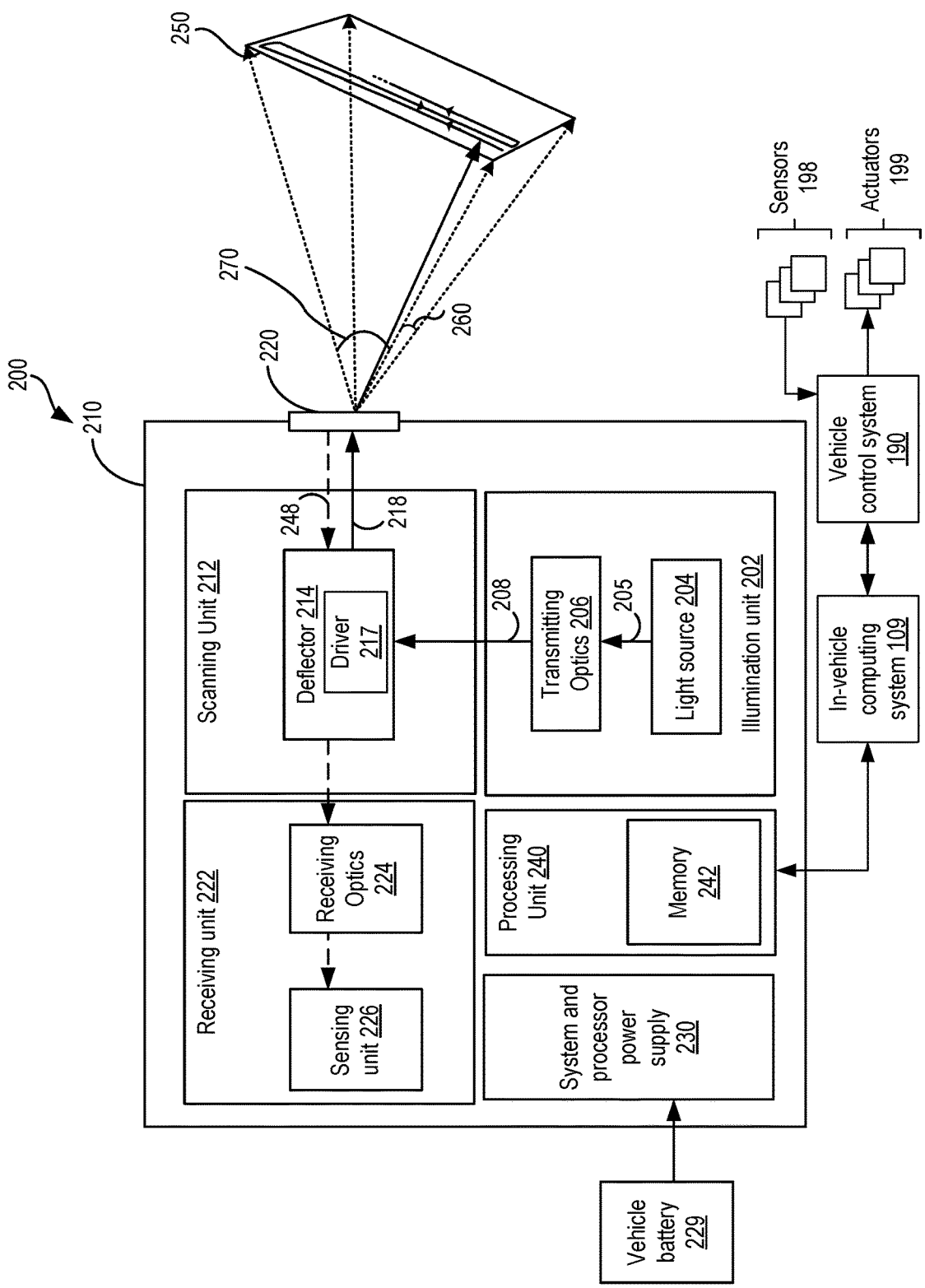
FIG. 2A shows an example light detection and ranging (LIDAR) system in accordance with one or more embodiments of the present disclosure.

In another embodiment, in addition to or alternative to first sensor system 120 configured as LIDAR, one or more sensor systems 121-125 may be configured as LIDAR systems, and may be used to scan and detect various objects and assess an environment in which vehicle 100 is operating. Thus, in one example, one or more LIDAR systems 120-125 may be used to acquire a surround view of the environment of vehicle 100. An example LIDAR system is illustrated at FIGS. 2A and 2B and described below.

In one example, when configured as LIDAR systems, one or more sensor systems 120-125 may provide a 360 degree field of view. For example, each of the one or more sensor systems 120-125 may include one or more LIDAR deflection units (also referred to as scanning units) that provide a respective individual field of view such that when combined, a scan of 360 degrees surrounding vehicle 100 may be achieved. Further, in some examples, each deflection unit may include a plurality of reflective surfaces or mirrors, wherein each reflective surface of the plurality of reflective surfaces or each mirror of the plurality of mirrors may be used to scan a secondary field of view covering a portion of the respective individual field of view of the deflection unit such that an aggregate of the respective secondary field of views provides the respective individual field of view of each deflection unit. It will be appreciated that any number of deflection units may be arranged in any manner to achieve a desired field of view (360 degrees or less) in any direction, depending on individual deflector unit field of view and location of the deflection unit. Accordingly, any number of LIDAR systems may be arranged in any manner to achieve a desired field of view (360 degrees or less). Example locations where LIDAR systems or at least a portion of LIDAR system (e.g., deflection unit) may be housed include but not limited to a bumper, a grille, a fender, a side panel, a spoiler, a roof, a headlight assembly, a taillight assembly, a rear-view mirror assembly, a hood, a trunk or any other suitable part of vehicle 100

As a non-limiting example, a first LIDAR system housed within a grille at vehicle front 102 may provide a 120 degree horizontal field of view, a second and third LIDAR systems housed within headlights on either side of the grille may each provide a 80 degree horizontal field of view that may or may not overlap with the 120 degree field of view of the first LIDAR system. In any case, an aggregate horizontal field of view of 280 degree or less surround a front portion of vehicle 100 may be obtained with the first, second, and third LIDAR systems. Similarly, one or more LIDAR systems may be arranged on each of right and left side panels, and further, one or more LIDAR systems may be arranged at vehicle rear 104, to obtain desired field of views surrounding the sides and rear of vehicle 100 respectively. Further, it may be noted that different vertical field of view angles may also be implemented. For example, a combination of a LIDAR system mounted on top of vehicle roof 106 and one or more LIDAR systems arranged on the periphery of vehicle 100 may be used to increase a vertical field of view.

In some examples, as shown in FIG. 1A, LIDAR system 100 may include a single sensor system 127 including one or more deflection units mounted on vehicle roof 106. Sensor system 127 may be used to scan 360 degrees or less around vehicle 100.

Plurality of sensor systems 120-127 may be operatively connected to and communicating with in-vehicle computing system 109, via an intra-vehicle communication system, such as CAN bus, that may utilized to transmit and receive information between individual components of plurality of sensor systems. The in-vehicle computing system 109 is operatively connected to and controls one or more actuators, e.g., a drivetrain 116 of the respective vehicle to affect movement of vehicle 100 via drive wheels 112 which may contact a road surface. In some examples, as discussed below at FIG. 1B, in-vehicle computing system 109 may communicate with a vehicle control system, which may be operatively connected to and may adjust vehicle operation via one or more actuators, such as actuators for steering control, braking control, drivetrain control etc.

Figure 1B:
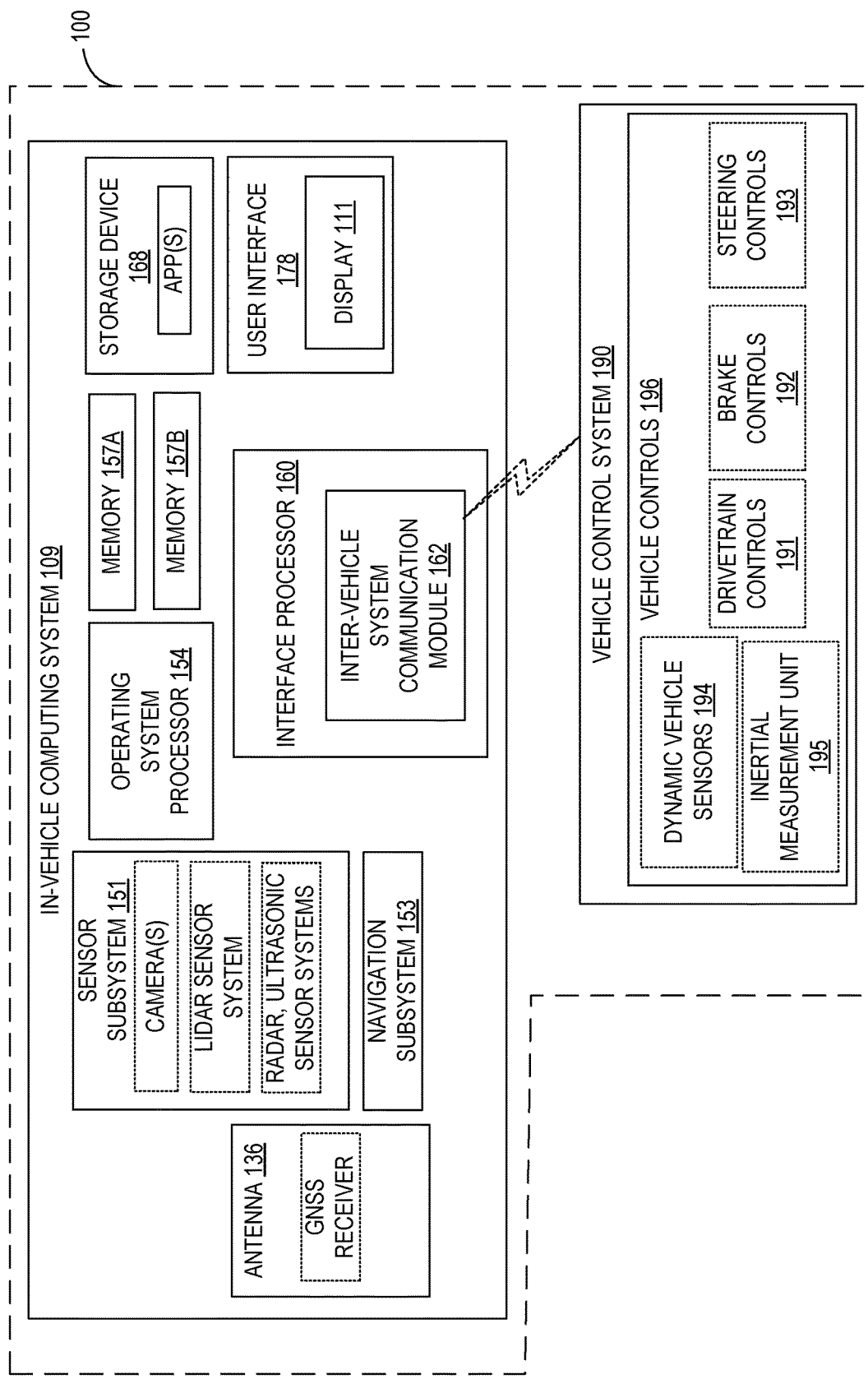
FIG. 1B shows an example in-vehicle computing system in accordance with one or more embodiments of the present disclosure.
Figure 2B:
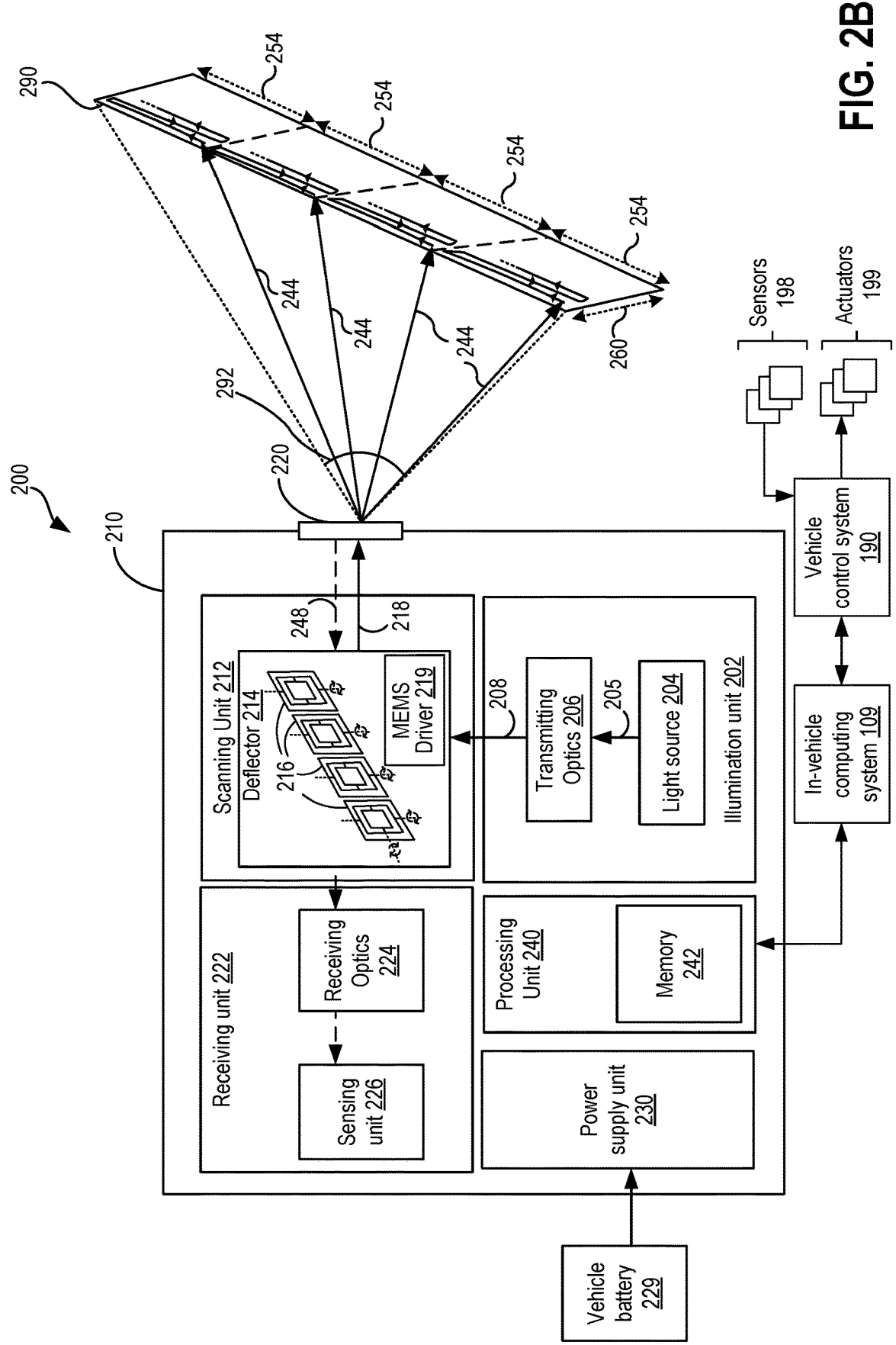
FIG. 2B shows an embodiment of the LIDAR system of FIG. 2A in accordance with one or more embodiments of the present disclosure.

FIG. 1B shows a block diagram of the in-vehicle computing system 109 configured and/or integrated inside vehicle 100. In-vehicle computing system 109 may perform one or more of the methods described herein in some embodiments.

In-vehicle computing system 109 may include one or more processors including an operating system processor 154 and an interface processor 160. Operating system processor 154 may execute an operating system on the in-vehicle computing system, and control input/output, and other operations of the in-vehicle computing system. Interface processor 160 may interface with a vehicle control system 190 via an inter-vehicle system communication module 162.

Inter-vehicle system communication module 162 may output data to other vehicle systems and vehicle control elements 196, while also receiving data input from other vehicle components and systems 196, e.g. by way of vehicle control system 190. When outputting data, inter-vehicle system communication module 162 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine CAN bus through which engine related information may be communicated, a climate control CAN bus through which climate control related information may be communicated, and a multimedia data network through which multimedia data is communicated between multimedia components in the vehicle). For example, the in-vehicle computing system 109 may retrieve from the engine CAN bus a current speed of the vehicle estimated by the wheel sensors, a power state of the vehicle via a battery and/or power distribution system of the vehicle, an ignition state of the vehicle, a steering angle sensed by a steering angle sensor, etc. In addition, other interfacing means such as Ethernet may be used as well without departing from the scope of this disclosure.

A non-volatile storage device 168 may be included in in-vehicle computing system 109 to store data such as instructions executable by processors 154 and 160 in non-volatile form. The storage device 168 may store application data, including prerecorded sound elements, to enable the in-vehicle computing system 109 to run an application for connecting to a cloud-based server and/or collecting information for transmission to the cloud-based server. The application may retrieve information gathered by vehicle systems/sensors, input devices (e.g., user interface 178), data stored in volatile 157A or non-volatile storage device (e.g., memory) 157B. In-vehicle computing system 109 may further include a volatile memory 157A. Volatile memory 157A may be random access memory (RAM). Non-transitory storage devices, such as non-volatile storage device 168 and/or non-volatile memory 157B, may store instructions and/or code that, when executed by a processor (e.g., operating system processor 154 and/or interface processor 160), controls the in-vehicle computing system 109 to perform one or more of the actions described in the disclosure.

One or more additional sensors may be included in a sensor subsystem 151 of the in-vehicle computing system 109. For example, the sensor subsystem 151 may include a camera, such as a rear view camera for assisting a user in parking the vehicle and/or a cabin camera for identifying a user (e.g., using facial recognition and/or user gestures). Sensor subsystem 151 may further include a plurality of sensors, such as plurality of sensors 120-127 (discussed at FIG. 1) for acquiring information regarding an external environment of the vehicle. Thus, the sensor subsystem 151 may include one or more LIDAR sensor systems, radar sensor systems, and ultrasonic sensor system and/or any combination thereof. A functional field of view of one or more sensors of the plurality of sensors may be adjusted in order to reduce power consumption and/or computational workload, as further discussed herein. Briefly, the functional field of view may be adjusted according to one or more of a vehicle speed indication from a vehicle speed sensor and an intended vehicle path according to indication from one or more of a steering angle sensor (e.g., indication regarding an intended turn radius of vehicle and therefore, curvature of the intended vehicle path), one or more cameras, and navigation subsystem 153.

Sensor subsystem 151 of in-vehicle computing system 109 may communicate with and receive inputs from various vehicle sensors and may further receive user inputs. For example, the inputs received by sensor subsystem 151 may include transmission gear position, transmission clutch position, gas pedal input, brake input, transmission selector position, vehicle speed, steering angle, engine speed, etc. While certain vehicle system sensors may communicate with sensor subsystem 151 alone, other sensors may communicate with both sensor subsystem 151 and vehicle control system 190, or may communicate with sensor subsystem 151 indirectly via vehicle control system 190. A navigation subsystem 153 of in-vehicle computing system 109 may generate and/or receive navigation information such as location information (e.g., via a GPS sensor and/or other sensors from sensor subsystem 151), route guidance, traffic information, point-of-interest (POI) identification, and/or provide other navigational services for the driver.

Vehicle control system 190 may include controls (e.g., sensors and/or actuators) for controlling aspects of various vehicle systems (e.g., drivetrain systems, braking systems, steering systems, etc.) involved in different in-vehicle functions. For example, vehicle controls 196 may include drivetrain controls 191, brake controls 192, and steering controls 193 for adjusting latitudinal and/or longitudinal control of the vehicle. As a non-limiting example, vehicle control system 190 may perform one or more control actions via one or more vehicle actuators (e.g., braking, throttle, drivetrain, and/or steering actuators) to adjust longitudinal and/or lateral control of vehicle 100. The one or more control actions may be performed in response to one or more inputs including but not limited to vehicle operator input (e.g., steering torque, steering angle, brake pedal position, accelerator position, gear position, etc.), input from sensor subsystem 151, input from navigation subsystem 153, input from an inertial measurement unit 195, and/or input from one or more dynamic vehicle sensors 194.

As a non-limiting example, the vehicle control system 190 (e.g., via a processor executing instruction stored in non-transitory memory) may combine information received from sensor subsystem 151, as well as data received from navigation subsystem 153, and may be configured to determine vehicle control actions in response thereto. For example, the vehicle control system 190 (e.g., via the processor) may output instructions to brake controls 192 (included in a braking system of vehicle 100) and/or drive train controls 191 (included in a drivetrain system of vehicle 100) to adjust a longitudinal movement of the vehicle.

Dynamic vehicle sensor 194 may include one or more sensors within a vehicle, such as engine parameter sensors, battery parameter sensors, vehicle parameter sensors, fuel system parameter sensors, ambient condition sensors, etc. Further, vehicle sensors 194 may include but not limited to a vehicle speed sensor, wheel speed sensors, steering angle sensor, etc., within the vehicle. Accordingly, the vehicle sensors may output data pertaining to vehicle operating parameters that may include but not limited to vehicle speed, steering angle, etc.

Inertial measurement unit 195 may include one or more accelerators and one or more gyroscopes, and/or other measuring units (e.g., magnetometers) IMU 195 may measure and output motion data of the vehicle such as velocity, acceleration, speed, and so on. IMU 195 may detect one or more orientation parameters of the vehicle, such as an orientation (e.g., heading, yaw, pitch, and roll) and elevation of the vehicle, and changes to the one or more orientation parameters. For example, a yaw rate, a steering angle, and/or a heading change may be derived from the orientation parameters and changes thereof detected by the IMU. Detected changes in the motion and orientation parameters of the vehicle may be used to determine whether the vehicle has initiated a maneuver, and therefore an intended vehicle path. In some examples, IMU 195 may be integrated with navigation subsystem 153 or other vehicle tracking systems.

In-vehicle computing system 109 may further include an antenna 136. Antenna 136 is shown as a single antenna, but may comprise one or more antennas in some embodiments. In one example, antenna 136 may include a global navigation satellite system (GNSS) receiver, which may communicate with a navigation satellite system (e.g., Global Positioning System) to determine the latitude and longitude of the location of the vehicle at any given moment. In some examples, the data received via antenna may be used for generating a high definition (HD) map in combination with data from sensor subsystem 151 and IMU 195.

One or more elements of the in-vehicle computing system 109 may be controlled by a user via user interface 178. User interface 178 may include a graphical user interface presented on a touch screen, and/or user-actuated buttons, switches, knobs, dials, sliders, etc. In one example, user interface 178 may include a display screen 111 for visually alerting an operator regarding sensor blockage, sensor unavailability, etc.

As mentioned above, in vehicle computing system 109 may be communicatively and operatively connected to one or more sensors of sensor subsystem 151, where the one or more sensors acquire information regarding an external environment of the vehicle 100. In one example, the one or more sensors include a LIDAR sensor system. During vehicle operation, a field of view of the LIDAR system may be Example LIDAR systems are discussed below at FIGS. 2A and 2B. Example field of view adjustments are described at FIGS. 3, 4A, 4B, 5, 6A, 6B, and 6C.

Turning to FIG. 2A shows an example LIDAR system 200 comprising an illumination unit 202, a scanning unit 212, a receiving unit 222, a processing unit 240, and a power supply unit 230 disposed in a housing 210. Illumination unit 202 includes at least one light source 204, which may be a laser device that emits light having a particular operating wavelength in the infrared, visible, or ultraviolet regions of the electromagnetic spectrum. As a non-limiting example, light source 204 may be a laser diode with an operating wavelength between approximately 870 nm and 920 nm. It will be appreciated that other types of light sources may be used. For example, light source 204 may be configured to emit lights of longer or shorter wavelengths, and are within the scope of the disclosure. Further, light source 204 may emit an output beam of light 205 which may be continuous-wave, pulsed, or modulated in any suitable manner. One or more parameters (e.g., format, pulse width, wavelength, frequency, etc.) of light output 205 from the light source 204 may be adjusted according to instructions stored in a memory 242 of processing unit 240, for example.

In some embodiments, a plurality of light sources may be used, which have the same operating wavelength, and in such cases, each light source may be used to scan a different area of a field of view. In some other embodiments, the plurality of light sources may have different operating wavelengths, and as such, the plurality of light sources may be used to scan a same or overlapping area of the field of view.

Illumination unit 202 may further include transmitting optics 206 that may be used for manipulating (e.g., collimating) light beam 205 emitted by light source 204. In one example, the transmitting optics 206 may include one or more collimating lenses to reduce divergence of the light beam 205, and a collimated beam 208 may be generated. When plurality of light sources are used, the one or more collimating lenses may be used to generate a corresponding collimated beam from each light source.

Scanning unit 212 includes a deflector 214 (also referred to herein as deflection unit) that functions as a steering element for directing light beam 208 originating from light source 204 to scan one or more objects within a field of view 250 of LIDAR system 200. Field of view 250 of LIDAR system 200 is a span of area that may be scanned by LIDAR system 200 and is based on at least scanning characteristics of deflector 214. Scanning characteristics of deflector 214 may include a scanning angular range (also referred to herein as a scanning field of view or simply field of view), a scanning frequency, and an angular resolution. In the example shown in FIG. 2A, field of view 250 is LIDAR may be the scanning field of view of deflector 214, and includes a horizontal field of view 270 and a vertical field of view 260. Deflector 214 may be operated by a software-based driver 217 to scan field of view 250 in a pattern (e.g., raster pattern, Lissajous pattern or other patterns). In one example, deflector 214 may be actuated and controlled by software-based driver 217, which may be an ASIC driver for example, that receives instructions from processing unit 240 based on one or more of executable instructions in memory 242 and signals from one or more sensors of vehicle 100.

FIG. 2A shows outbound light beam 218 directed by deflector 214 toward field of view 250 via an optical window 220. When outbound beam 218 reaches an object within field of view 250, the object may scatter or reflect at least a portion of outbound beam 218. The portion of outbound beam 218 may return to LIDAR system 200 via optical window 220. The portion of outbound beam 218 that is reflected or scattered and returned to LIDAR system 200 is indicated by inbound beam 248 (dashed arrow).

In one example, deflector 214, in addition to directing outbound beam 218 towards field of view 250, may also receive inbound beam 248 from objects within field of view 250 and direct it toward receiving unit 222. Receiving unit 222 includes a sensing unit 226 for sensing the inbound light (that is, reflected or scattered light) from the object. Receiving unit 222 may further include receiving optics 224 for directing inbound light to sensing unit 226. Information from sensing unit 226 regarding the object is then processed by processing unit 240. An example deflector 214 used to direct light beam towards field of view 250 as well as direct light received from the object to sensing unit 226 may be an asymmetrical deflector. One example of an asymmetrical deflector may be any of a polarization beam splitter, an optical isolator, etc. Deflector 214 may include other types of mirrors, prisms, controllable lenses, mechanical mirrors, mechanical scanning polygons, active diffraction elements (e.g., a controllable LCD), Risley prisms, a non-mechanical electro optical beam steerer, polarization gratings, an optical phased array (OPA), or any other suitable light steering element.

In some embodiments, scanning unit 212 may include a second deflector (not shown) for receiving light reflected from the object within field of view 250 and directing the reflected light from the object toward receiving unit 222.

In some embodiments, scanning unit 212 may include one or more mirrors as deflector 214, where each mirror is mechanically driven by a galvanometer scanner, a resonant scanner, voice coil motor, or any suitable combination thereof. A galvanometer scanner may include a galvanometer-based scanning motor with a magnet and coil. When an electrical current is supplied to the coil, a rotational force is applied to the magnet, which causes a mirror attached to the galvanometer scanner to rotate. The electrical current supplied to the coil may be controlled to dynamically change the position of the galvanometer mirror. A resonant may include a spring-like mechanism driven by an actuator to produce a periodic oscillation at a substantially fixed frequency (e.g., 1 kHz). A voice coil motor may include a magnet and coil. When an electrical current is supplied to the coil, a translational force is applied to the magnet, which causes a mirror attached to the magnet to move or rotate. In some embodiments, electromechanical scanning that utilizes electric motors with a mechanical stage for scanning a horizontal and vertical field of view, may be used for driving deflector 214. In some embodiments, scanning unit 212 may be configured as an Optical Phased Array (OPA), wherein OPAs may employ any type of phase modulator, such as liquid crystal, silicon photonics, and MEMS based modulators.

In one embodiment, a microelectromechanical (MEMS) mirror may be used as deflector 214 for deflecting light from source 202 to field of view 250. The MEMS mirror may be a single axis MEMS scanner or a dual axis MEMS scanner, for example. The MEMS mirror may be operated by a MEMS driver ASIC which actuates, controls, and senses MEMS mirror oscillation. The MEMS driver ASIC may use an actuation mechanism, which may be an electrostatic, an electromagnetic, or a piezoelectric actuation mechanism, for example. Thus, in one example, electrostatic comb drives may be used for MEMS mirror scanning, wherein an electrostatic force is generated via a comb drive structure (e.g., by applying high voltage to the comb drive structure) for deflecting mirrors. In another example the MEMS mirror assembly may include a reflector suspended via a torsional spring on a frame (e.g., gimbal frame), the frame comprising a fabricated electrical coil, and the assembly may further magnets which induce a fixed magnetic field on the assembly. In this case, an electro-magnetic actuation is provided by applying electrical current to the electrical coil, which generates a magnetic torque on the frame. In another example, a moving magnet configuration may be utilized for actuation of a dual-axis MEMS mirror. An actual mirror deflection angle of the MEMS mirror, in both directions, may be measured via Hall sensors placed underneath the mirror. In yet another example, actuation of the MEMS mirror may be performed using piezoelectric actuators (e.g., PZT ceramic actuators). Additional structures, such as a mechanical leverage, flexible beam, and mirror plate may be used to achieve a dual axis scanning and greater mirror displacement when piezoelectric actuation is employed. Other actuation mechanisms that are suitable for controlling MEMS mirror scanning in an automotive environment may be used, and are within the scope of the disclosure.

The MEMS mirror and its driver ASIC may be included in the scanning unit 214. MEMS driver ASIC may send and receive signals from processing unit 240. Processing unit 240 may synchronize a MEMS phase clock with operation of illumination unit 202, and at the same time, enable synchronization with sensing unit 226 of receiving unit 222 for sensing reflected light. In one example, sensing unit 226 may include circuitry for sampling and digitizing the reflected light. The digitized data from sensing unit 226 may be transmitted to processing unit 240 for further signal processing (e.g., generation of depth map). Thus, processing unit 240 may include one or more hardware components, one or more hardware-accelerated processing units such as field programmable gate array (FGPA), and/or dedicated hardware units for signal processing and generation of point clouds. In one example, processing unit 240 may receive signals from one or more sensors of vehicle 100, and may send signals to one or more actuators of LIDAR system 200 to control operation of LIDAR system 200 based on the sensor signals and executable instructions stored in non-transitory memory 242 of the processing unit 240. For example, the in-vehicle computing system 109 may compute an intended vehicle path based on signals from a vehicle speed sensor and one or more of a steering angle sensor, a navigation system, and one or more cameras acquiring information regarding vehicle travelling environment. The information regarding intended vehicle path information as well as sensor signals may be sent to processing unit 240, which may adjust operation of LIDAR system 200 based on executable instructions in memory 242 and the information and signals received from the in-vehicle computing system. In some examples, the in-vehicle computing system 109 may adjust operation of the LIDAR system based on executable instructions stored in its memory and signals received from the vehicle speed sensor, steering angle sensor, navigation system, and the one or more cameras. Example routines that may be executed by processing unit 240 or in-vehicle computing system 109 for adjusting operation of LIDAR system 200, in particular adjusting operation of one or more MEMS mirror, are discussed below at FIGS. 3, 4A, and 4B.

Processing unit 240 may be communicatively and operatively coupled to in-vehicle computing system 109 and/or vehicle control system 190. In-vehicle computing system 109 and vehicle control system 190 are described above with respect to FIGS. 1A and 1B, and will not be repeated. Further, vehicle control system 190 is shown receiving information from a plurality of sensors 198 (various examples of which are described herein) and sending control signals to a plurality of actuators 199 (various examples of which are described herein). As one example, sensors 198 may include vehicle speed sensor located on a shaft of a transmission of vehicle 100, a steering angle sensor coupled to a steering wheel, and IMU. Vehicle control system 190 may also receive information regarding external environment from LIDAR sensor system 200 and one or more other sensors (e.g., LIDAR, RADAR, LADAR, ultrasonic, cameras) that acquire and/or process information regarding external vehicle environment. In one example, the vehicle control system 190 may receive sensor data from the LIDAR sensor and/or one or more other sensors directly from a processing unit of the respective sensor, via in-vehicle computing system 109, or any combination thereof. It will be appreciated that other sensors for estimating/measuring vehicle operation and/or engine operation such as an exhaust gas sensor located upstream of an emission control device of vehicle 100, a temperature sensor, a fuel system pressure sensor, a fuel system temperature sensor, and a manifold pressure sensor, additional pressure, temperature, air/fuel ratio, and composition sensors may be coupled to various locations in the vehicle 100. Vehicle control system 190 may generate vehicle control actions, and may output instructions to one or more vehicle actuators to enact the control actions to adjust operation of vehicle 100 based on indications from sensors 198.

As a non-limiting example, vehicle control system 190 may receive information regarding one or more objects (e.g., distance to object from vehicle, type of object, velocity of object, direction of object movement, etc.) sensed by LIDAR system 200 (either directly from processing unit 240 or via in-vehicle computing system 109), and may adjust operation of one or more actuators (e.g., drivetrain control via electronic throttle control, braking controls, steering controls, etc.) of one or more sub-systems of vehicle 100 based on the information from LIDAR system. Vehicle control system 190 may additionally or alternatively output corresponding information (e.g., depth map generated from LIDAR sensed data) to the vehicle operator via an ADAS-operator interface.

FIG. 2B shows an embodiment of LIDAR system 200 wherein a plurality of MEMS mirrors 216 are used to increase a field of view of the LIDAR system 200. While the present example shows four MEMS mirrors, any number of MEMS mirrors may be used depending on individual field of view of MEMS units and a total field of view. In this example, each of plurality of MEMs mirrors 216 has an individual horizontal field of view 254 and an individual vertical field of view 260. Accordingly, beams 244 from each MEMS mirror 216 is shown scanning individual horizontal field of view 254 and vertical field of view 260.

Plurality of MEMS mirrors 216 together may provide a total scanning field of view 290 including a total horizontal field of view 292. Vertical field of view 260 may be the same as the individual vertical field of view. It may be noted that the vertical field of view may be increased by increasing a number of rows of MEM mirrors, for example, or any other relevant arrangement and configuration of a plurality of MEMS mirrors that increases the vertical field of view.

The example shown at FIG. 2B herein shows contiguous field of view of the MEMS mirrors, wherein a first field of view of a first MEMS mirror is contiguous with a second field of view of a second MEMS mirror, the second field of view is contiguous with the first field of view and a third field of view of a third MEMS mirror, and the third of view is contiguous with the second field of view and a fourth field of view of a fourth MEMS mirror. It will be appreciated that in some examples the adjacent field of views may have overlapping regions.

Operation of plurality of MEMS mirrors may be controlled via a MEMS driver 219. In one example, MEMS driver 219 may individually control operation of each of the plurality of MEMS mirrors 216 in a synchronized manner. In some examples, more than one MEMS drivers may be used, wherein each of the one or more MEMS drivers adjusts the operation of a sub-set of MEMS mirrors in a synchronized manner. Further, in some other example, each MEMS mirror may be operated by its own MEMS driver ASIC, and the operation of all the MEMS mirrors and drivers may be coordinated in a synchronized manner via one of the MEMS mirror driver and/or processing unit 240.

Returning to FIG. 2A, sensing unit 226 may receive or detect photons from inbound beam 248 and generate one or more representative signals. For example, sensing unit 226 may generate an output electrical signal that is representative of inbound beam 248. The electrical signal may be sent to processing unit 240 that includes circuitry (e.g., an ASIC or FPGA), or other suitable circuitry configured to analyze one or more characteristics of the electrical signal from the sensing unit 226 to determine one or more characteristics of the object in the field of view. The one or more characteristics may include distance from the LIDAR system 200, which may be determined by analyzing the time of flight or phase modulation for a beam of light 205 transmitted by the light source 204.

Sensing unit 226 includes a plurality of detection elements for detecting light reflected back from objects within field of view 250. In one example, sensor 116 may be an array of photodiodes such as a solid-state device or SiPM (Silicon photomultipliers) built from an array of avalanche diodes (e.g., APD, SPAD, or combination thereof) configured for sensing properties of reflected light or reflected electromagnetic wave or photons that may be used to measure both the time of flight from a laser transmission event to the reception event and the intensity of the received light or electromagnetic wave or photon.

LIDAR system 200 includes a system and processor power supply unit 230 that supplies electrical power to illumination unit 202, scanning unit 212, receiving unit 222, and processing unit 240. Power supply unit 230 may draw electrical power from a vehicle battery 229.

During some vehicle operating conditions, a LIDAR system that includes a plurality of deflectors providing a greater field of view may scan out-of-path objects that are not relevant to operation of the vehicle in the intended vehicle path or in some cases, multiple sensor systems may scan out-of-path areas leading to unnecessary redundancy in information that is not pertinent to operation of the vehicle in the intended vehicle path. As a result, vehicle power resources and computational resources are wasted in scanning and processing out-of-path objects in out-of-path regions (that is vehicle surroundings that are not in the vehicle's intended path or within a threshold region (or area) surrounding the intended vehicle path). In order to improve resource utilization, including electrical power utilization and computational resource utilization, a field of view of a sensor system may be adjusted according to intended vehicle path by operating one or more deflector units that are configured to scan the intended vehicle path and the threshold region (the threshold region flanking or directly adjacent to the intended vehicle path on at least two sides) and not operating (powering off or not supplying electrical power) to remaining deflector units that do not cover scanning of the vehicle intended path and the threshold regions.

In this way, by reducing a number of deflector units to sense from, less power resources and computational resources may be utilized, and overall electrical power consumption may be reduced. Consequently, a vehicle operating range, particularly for electrically powered vehicles, may be increased. Further, the conserved resources may be allocated for other vehicle control systems, for example to improve transient response.

Figure 3:
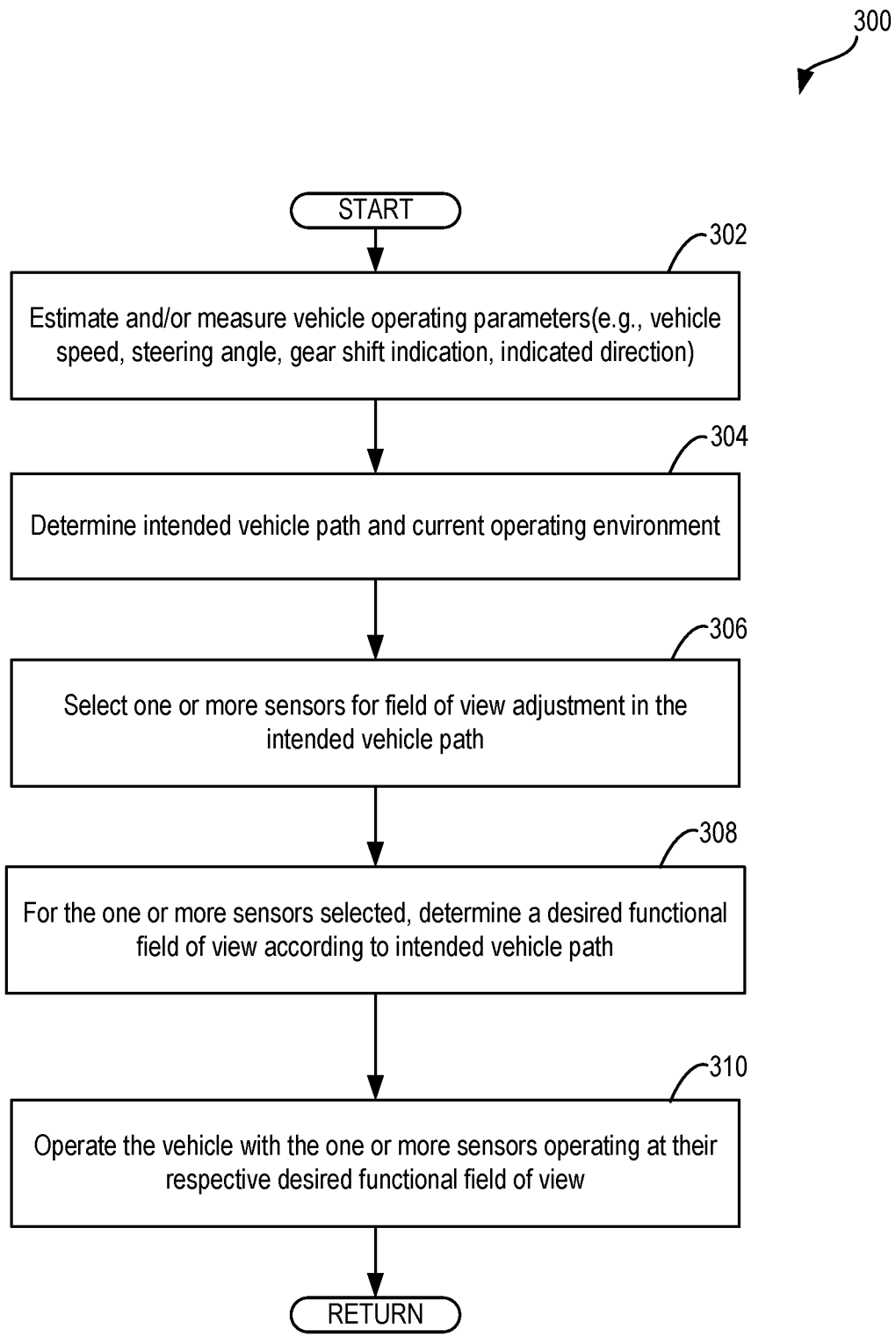
FIG. 3 shows a high level flowchart of an example method for operating one or more sensor systems that are used for evaluating an external environment of a vehicle in accordance with one or more embodiments of the present disclosure.

While the embodiments herein are described with respect to scanning LIDAR systems, all the details and variations discussed herein with respect to scanning LIDAR systems may be implemented for other types of LIDAR system as well (e.g. flash-type LIDAR, staring-array LIDAR, etc.) without departing from the scope of the disclosure. FIG. 3 shows a high-level flowchart illustrating an example method 300 for adjusting operation of one or more sensors coupled to a vehicle, where the one or more sensors are used for evaluating an environment of the vehicle. Method 300 may be executed based on instructions stored in a memory of a processor, such as processor 154 of in-vehicle computing system 190 at FIG. 1B or processing unit 240 at FIG. 2B, a processor of vehicle control system 190 or any combination thereof. Although method 300 will be described with respect to FIGS. 1A, 1B, 2A, and 2B, the method may be applicable to other systems without departing from the scope of the disclosure.

At 302, method 300 includes estimating and/or measuring vehicle operating parameters. The vehicle operating parameters may include a vehicle speed, a steering angle, a gearshift indication, an indication of direction, and a vehicle operating environment. The vehicle speed to be determined according to a vehicle speed sensor coupled to a shaft of the transmission of the vehicle or coupled to a driven or non-driven wheel's tone ring. The steering angle may be determined according to an indication from a steering angle sensor that may be coupled to a steering column connected to a steering wheel and/or coupled to a steering shaft and/or a steering gear. The steering angle sensor may provide an indication of an angle of turn, a direction of turn, and the rate of turn requested by a driver via the steering wheel. The indication of direction will be provided according to position of the direction indicator that may be coupled to a steering column connected to the steering wheel list. The vehicle operating parameters may also include one or more vehicle motion and/or orientation parameters including a vehicle acceleration, yaw, pitch, roll, heading, and elevation, which may be determined according to one or more indications from an inertial measurement unit (IMU), such as IMU 195, within the vehicle.

Next, at 304, method 300 includes determining an intended vehicle path of the vehicle using the one or more vehicle operating parameters discussed above. In one example, the method may include determining if the intended vehicle path is a straight path or curved path. For example, an angle of turn from the steering angle sensor may be used to determine if the intended vehicle path is a straight path or a curved path. The processor may determine that the intended vehicle path is a straight path responsive to the angle of turn being less than a threshold angle. If the angle of turn is greater than the threshold angle, the processor may determine that the intended vehicle path is a curved path. Further, a degree of the angle of turn from the steering angle sensor, a steering ratio, and a length of a wheel base of the vehicle may be used to determine a curvature of the intended vehicle path. Furthermore, a direction of turn (e.g., right or left) may be determined according to input from the steering angle sensor, and a direction of travelling path (e.g., forward or reverse) according to the gear position may be taken into account in determining the intended vehicle path. Further still, additionally or alternatively, indications from the IMU may be utilized to determine the intended vehicle path.

Further, at 304, method 300 includes assessing a current operating environment of the vehicle. The operating environment may be assessed according to input from one or more cameras, such as forward facing camera 126 at FIG. 1A coupled to a front side of the vehicle, the vehicle speed sensor and/or a navigation system. For example, images captured by the one or more cameras may be used for traffic sign detection and recognition, which may in turn be used to evaluate the current operating environment of the vehicle. In some examples, images from the one or more cameras may be used in combination with the vehicle speed and/or input from the navigation system to evaluate the operating environment of the vehicle. As a non-limiting example, if a traffic pole is detected, the processor may determine that the vehicle is approaching an intersection or at an intersection. It will be appreciated that other sensors mounted on the vehicle, such as one or more of plurality of sensors 120-127 that may include LIDAR sensors, may be used to for traffic sign detection and recognition. As another non-limiting example, images (e.g. parking area signs, markings of parking spaces on the road) from the camera in combination with the vehicle speed and/or speed of other vehicles in the environment (e.g., from indications from the vehicle's ultrasonic sensor) may be used to determine if the vehicle is operating in a parking area. Furthermore, images from the one or more cameras may be used to evaluate a level of traffic including vehicular traffic (e.g., moving vehicle, parked vehicles, etc.) and non-vehicular traffic (e.g., human traffic, animal traffic) in the current operating environment of the vehicle.

Taken together, the one or more cameras facing the external environment of the vehicle may be used to detect and recognize traffic signs, road signs, objects, etc., so as to evaluate the operating environment (e.g., highway, parking area, residential area, intersection, etc.) of the vehicle. The one or more cameras may also be used to evaluate the level of vehicular and non-vehicular traffic in the current operating environment. In some examples, additionally, an intended operating vehicle speed (e.g., based on speed limit signs recognized via one or more cameras) may be considered in evaluating the operating environment. Additionally or alternatively, input from the vehicle speed sensor and/or navigation system (e.g., vehicle location information from a GPS sensor, and route information from vehicle navigation system) and/or input from the onboard IMU (e.g., vehicle acceleration, yaw rate, pitch angle, roll angle, elevation, inclination, relative vehicle position, heading etc.) may be used to evaluate the operating environment. Upon determining the intended vehicle path and the operating environment, method 300 may proceed to 306. At 306, method 300 may include selecting one or more sensors for adjustment of field of view. The one or more sensors selected may include ADAS and/or autonomous sensor systems that are used for detecting and identifying objects in the external environment of the vehicle. Therefore, the one or more sensors selected may be one or more a LIDAR sensor system, a RADAR sensor system, an ultrasonic sensor system, and a machine-vision based camera system that may be utilized for evaluating the external environment of the vehicle in the intended vehicle path. Further, in one embodiment, each of the one or more sensors selected may include a plurality of sensor units (e.g., two or more sensor units) that together provide a greater field of view than the individual sensor units. Said another way, some sensor systems may include more than one sensor unit so as to achieve a greater field of view of the sensor system, and as such, the one or more sensors selected may be sensor systems that have a plurality of sensor units. As a non-limiting example, a LIDAR sensor system may include a plurality of LIDAR units, each of the plurality of LIDAR units having a first field of view, and the plurality of LIDAR units having a second field of view greater than the first field of view of the individual LIDAR units. In another embodiment, a single sensor system may include a plurality of subunits, wherein each of the plurality of subunits are used to scan a field of view, and when each of the plurality of subunits are combined (e.g., positioned together with or without overlapping field of views), they provide an aggregate field of view greater than the individual field of view of each sub unit. As a non-limiting example, a single LIDAR system may include a plurality of deflection units (e.g., Deflector 214 at FIG. 2A, or MEMS units 216 at FIG. 2B) for increasing a total field of view of the LIDAR system. While the above examples are described with respect to LIDAR sensor systems, it will be appreciated that other sensors for ADAS and/or autonomous driving including radar sensors, camera systems, ultrasonic systems, etc., may be implemented with plurality of sensor units and/or plurality of sub-units (e.g., sub-units of the sensor unit) in order to increase a field of view of the respective sensor system, and as such the one or more sensor systems that are selected for adjustment of field of view may be any of the sensor systems that have a plurality of sensor units or plurality of subunits of the sensor unit that expand the field of view of the respective sensor system. Further, the plurality of sensor units and/or plurality of subunits of the sensor unit may be individually controlled. For example, power input to each of the plurality of sensor units and/or each of the plurality of subunits may be individually controlled such that field of view of the sensor system may be decreased by not operating (e.g., unpowered) some of the plurality of sensor units and/or some of the plurality of subunits. In some examples, detector subunits (e.g., in case of a LIDAR system, detector subunits may be one or more photodiodes of sensing unit 226 that receives reflected light from the objects) that correspond to detecting objects sensed by the sensor units (or the subunits) that are not operated may also be unpowered or put in a low-power mode.

Upon selecting the one or more sensors for field of view adjustment, method 300 proceeds to 308. At 308, method 300 includes determining a desired functional field of view for the one or more sensors (selected at 306) according to the intended vehicle path. The desired functional field of view may cover detection and/or recognition of objects within the intended vehicle path and within one or more threshold regions surrounding the intended vehicle path. The one or more threshold regions may include areas directly adjacent to the intended vehicle path, and may include areas or regions flanking the intended vehicle path, for example. Further, vehicle parameters including vehicle speed and vehicle operating environment may be taken into account in determining the intended vehicle path and/or the threshold regions, and thus, the desired functional field of view. Details of determining the desired field of view based on the intended vehicle path will be described with respect to LIDAR systems at FIGS. 4A, 4B, and 5. Briefly, as the vehicle path changes, operational control (e.g., supplying electrical power to the sensor or unpowering the sensor and/or respective driver units for operating the sensor units) and/or processing control (e.g., operation of detector units that receive sensed information from the sensor units and processing of the sensed information) may be adjusted so that a functional field of view of sensor system is adjusted to cover in-path objects with respect to the vehicle. Thus, the desired functional field of view of a sensor is an adjusted field of view such that the sensor scans an in-path environment including the intended vehicle path and threshold regions, wherein the adjustment is performed by operating a desired number of units, and includes a horizontal scanning field of view and a vertical scanning field of view of the sensor.

As a non-limiting example, one or more sensor units or one or more sub-units of a sensor system may be unpowered to reduce power consumption and reduce processing resource consumption. Specifically, the one or more sensor units or sub-units that are unpowered may have a field of view that cover out-of-path objects that are not within the intended vehicle path or within a threshold region of the intended vehicle path while a number of remaining sensor units of the sensor system may be operated to cover detection and recognition of objects within the intended vehicle path and within the threshold range surrounding the intended vehicle path.

Next, at 310, method 300 includes operating the vehicle with the one or more selected sensors operating at their respective desired functional field of view. For example, a number of sensor units of the sensor system and/or a number of sensor subunits that cover a field of view outside the desired functional field of view maybe unpowered, while a second number of sensor units of the sensor system and/or a second number of sensor subunits of the sensor system required to scan the desired functional field of view may be operated (e.g., electrically powered and actuated so as to scan the desired field of view). That is, the second number of sensor units or subunits may be selectively actuated to scan the desired functional field of view while the number of sensor units or subunits may not be actuated (thus, environment outside the functional field of view is not scanned). Further, sensor data acquired via the second number of units is selectively processed. In one example, only the second number of sensor units or sub-units may be operated with electrical power and actuated to scan the desired functional field of view, and sensor data from the second number of units operated is processed. In another example, all the sensor units may be operated with electrical power and actuated to scan the environment covering more than the desired functional field of view; however, sensor data from the second number of units that scan the desired functional field of view is selected for processing; while remaining sensor data (from sensors that scan outside the functional field of view) are not processed.

In this way, by evaluating intended vehicle path and the operating environment of the intended vehicle path, and operating one or more sensors to cover objects within a threshold range of the intended vehicle path, power consumption of the sensor systems that are used for detecting and/or recognizing objects in an environment of the vehicle may be reduced. This in turn may increase operating range of the vehicle. Particularly, operating range of electrically powered vehicles may be improved.

Figure 4A:
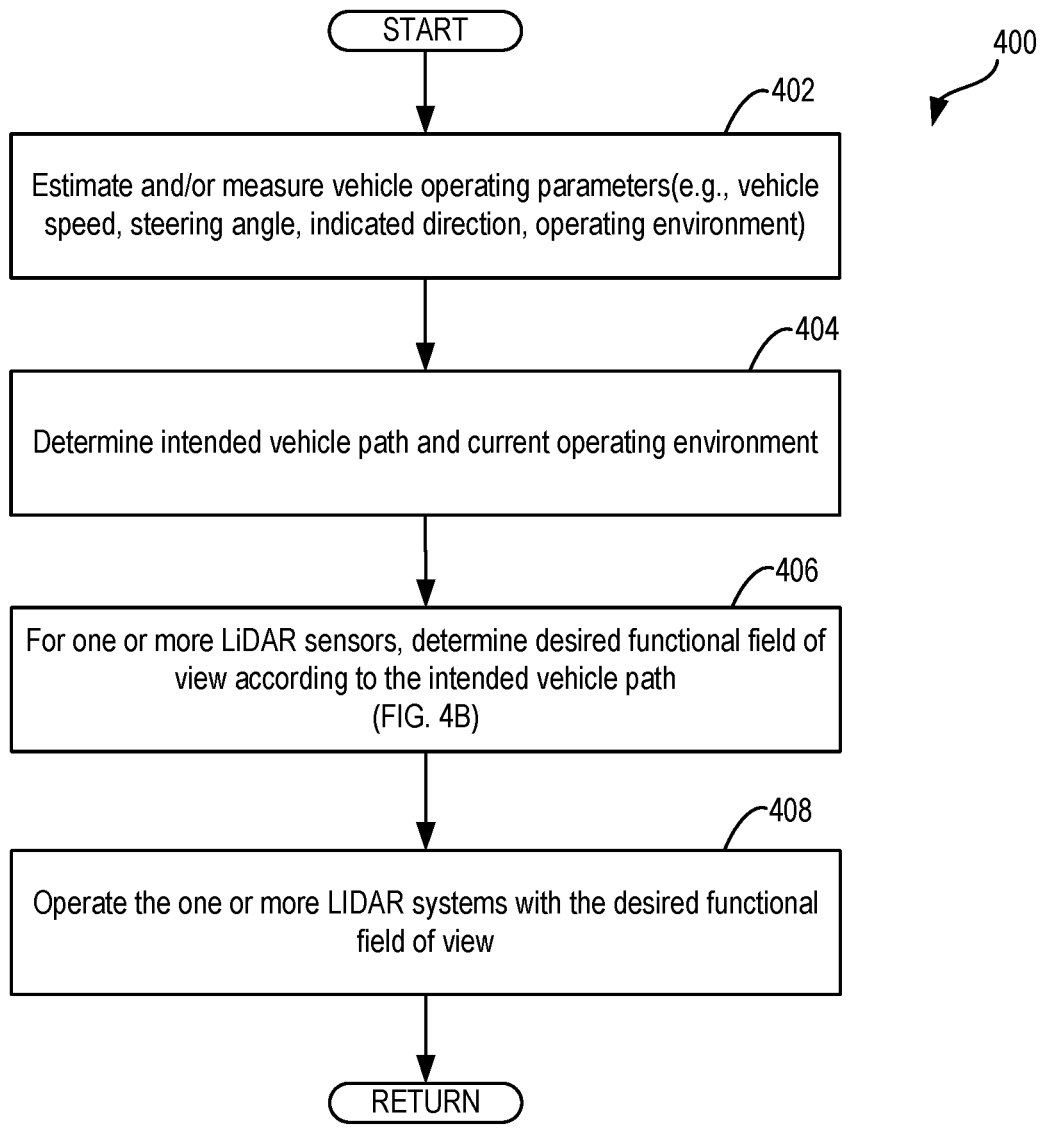
FIG. 4A shows a high level flow chart of an example method for adjusting operation of one or more LIDAR sensor systems in accordance with one or more embodiments of the present disclosure.

Turning to FIG. 4A, it shows a high-level flowchart illustrating an example method 400 for operating one or more LIDAR sensor systems, such as LIDAR system 200 at FIG. 2A or 2B, which may be examples of sensor system 120 and/or sensor system 127, at FIG. 1A, mounted to a part of a vehicle, such as vehicle 100 at FIG. 1A In particular, method 400 describes an example adjustment of a functional field of view of one or more LIDAR sensor systems according to an intended vehicle path. Methods 400 and 450 (described at FIG. 4B) may be executed based on instructions stored in a memory of a processor, such as processor 154 of in-vehicle computing system 190 at FIG. 1B or processing unit 240 at FIG. 2B, a processor of vehicle control system 190 or any combination thereof. Although method 400 will be described with respect to FIGS. 1A, 1B, 2A, and 2B, the method may be applicable to other systems without departing from the scope of the disclosure.

Method 400 begins at 402. Steps 402 and 404 are similar to steps 302 and 304 discussed with respect to FIG. 3 and therefore, details of the similar steps will not be repeated. Briefly, using input from the vehicle speed sensor and steering angle sensor the processor may determine an intended vehicle path for the vehicle. Further, using input from one or more cameras, such as forward facing camera 126 at FIG. 1A, navigation system, and/or vehicle speed sensor and/or inertial measurement unit, the current operating environment of the vehicle may be determined. Upon determining the intended vehicle path and the current operating environment, method 400 proceeds to 406.

At 406, method 400 includes determining a desired functional field of view according to the intended vehicle path for one or more LIDAR sensors mounted on the vehicle. As the intended vehicle path changes, the LIDAR system may be adjusted to operate with the desired functional field of view based on the intended vehicle path so as to scan the intended vehicle path and one or more threshold regions surrounding the intended vehicle path. Determining the desired functional field of view includes, for the one or more LIDAR sensor systems, determining a number of deflectors to operate and a position of deflectors that are operated to achieve the desired functional field of view. The details of determining the desired functional field of view for a LIDAR system, such as LIDAR system 200, is discussed below with respect to FIG. 4B.

Further, determining a desired functional field of view for a given LIDAR sensor system includes determining one or more of a desired horizontal functional field of view and a desired vertical functional field of view for the LIDAR sensor system.

Upon determining the desired functional field of view for each of the one or more LIDAR systems (as discussed below at FIG. 4B), method 400 proceeds to 408. At 408, method 400 includes operating the one or more LIDAR sensor systems to scan the desired functional field of view.

Figure 4B:
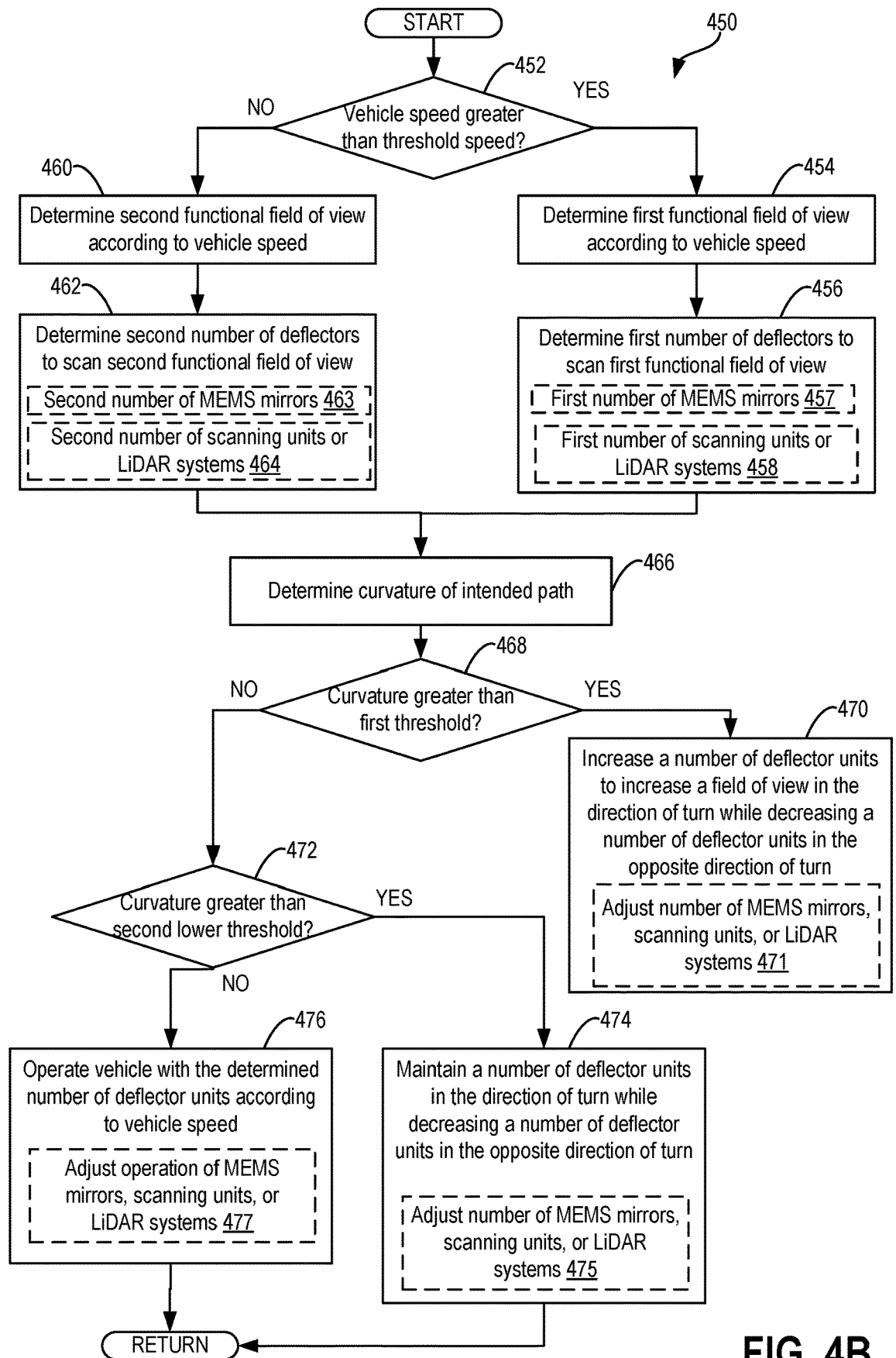
FIG. 4B shows a high level flow chart of an example method for determining a functional field of view for a LIDAR system in accordance with one or more embodiments of the present disclosure.

Turning now to FIG. 4B, it shows a high-level flowchart illustrating an example method 450 for determining a desired functional field of view of a LIDAR sensor, such as LIDAR sensor 200 at FIGS. 2A and 2B.

At 452, method 450 includes determining if a current vehicle speed is greater than a threshold speed. In one example, the threshold speed may be predetermined, wherein the threshold speed is based on a reaction time for the vehicle in response to an object in the vehicle's environment. The reaction time may take into account an overall time duration taken by the LIDAR system to detect and/or recognize an object in the environment of the vehicle. Accordingly, if the reaction time is greater, the threshold speed is lower, and vice-versa. In another example the threshold speed may determine whether the vehicle is operating in a high-way environment, and accordingly the threshold speed may be based on a minimum highway speed in a current geographical area which the vehicle is operating. Thus, input from the navigation system and/or a camera acquiring traffic sign information may be used to determine the threshold speed.

If the current vehicle speed is greater than the threshold speed, the answer at 452 is YES, and the method proceeds to 454. At 454, method 450 includes determining a first functional field of view according to vehicle speed. Determining the first functional field of view may include determining a first degree of a horizontal field of view according to the current vehicle speed. At higher vehicle speeds greater than the threshold speed, in order to ensure sufficient reaction time to detect objects travelling into the intended vehicle path, the functional field of view of the LIDAR sensor is increased to scan a greater region including the intended vehicle path and a greater threshold region surrounding the intended vehicle path. Thus, in one example, the first functional field of view, which is a wider field of view, is used for vehicle speeds at or greater than the threshold speed while a second functional field of view (also discussed with respect to step 460 below), which is narrower than the first field of view, is used for vehicle speeds less than the threshold speed. Said another way, a first degree of horizontal field of view is greater at higher speeds at or above the threshold speed than a second degree of horizontal field of view at vehicle speeds below the threshold speed. In some examples, a degree of vertical field of view may also be greater.

In the above example, a single threshold speed is used to determine whether a first functional field of view is used or a second functional field of view is used. It will be noted that different speed thresholds may be used to provide a range of field of view widths and heights. Accordingly, in some examples, a look-up table stored in the memory of the processor may include a corresponding field of view (horizontal and/or vertical fields of view) for various vehicle speeds or speed ranges (e.g., 0-20 mph, 20-40 mph, 40-60 mph, etc., or any other speed ranges), and based on the current vehicle speed, a nominal field of view for the current vehicle speed may be determined using the look-up table. For example, for each LIDAR sensor, a look-up table indicating a nominal field of view for various vehicle speeds or speed ranges may be generated at the time of installation and stored in the memory of the processor. During vehicle operation, the nominal field of view may be adopted according to the vehicle speed using the look-up table, and thus, the first functional field of view is the nominal field of view for the current vehicle speed.

Upon determining the first functional field of view, method 450 proceeds to 456. At 456, method 450 includes determining a first number of deflector units to scan the first functional field of view. As discussed above at FIGS. 2A and 2B, the LIDAR sensor unit may include a plurality of deflector units, wherein each of the deflector units may be pivoted about a central axis to scan an individual field of view such that an aggregate field of view, which is greater than each individual field of view, may be scanned by the plurality of deflector units. Thus, at 456, the processor may determine a first number of deflector units required to scan the first functional field of view. The individual field of views may or may not overlap with each other. As a non-limiting example, a single deflector unit may provide a 45 degree horizontal field of view and a 30 degree vertical field of view. In order to achieve scanning of 160 degree horizontal field of view, four deflector units may be arranged with some overlap of field of view between at least two deflector units. For example, the four deflector units may be arranged in a row with partial overlap in field of view between adjacent deflector units to scan 160 degree horizontal field of view and 30 degree vertical field of view. If the first functional horizontal field of view is 80 degrees, the first number of deflector units is 2. As another non-limiting example, the four deflector units may be arranged to scan 180 degrees horizontal field of view and 30 degrees vertical field of view. For a first functional horizontal field of view of 80 degrees, the first number of deflector units is 2 for this example arrangement.

As yet another non-limiting example, the above-mentioned four deflector units may be arranged in two rows of two deflector units each to scan 90 degree horizontal field of view and 60 degree vertical field of view. In such an arrangement, the first number of deflector units is 4 to scan a horizontal field of view of 80 degrees.

In some embodiments, where a plurality of MEMS mirrors are used as deflection units for scanning, as indicated at 457, a first number of MEMS mirrors to scan the first functional field of view may be determined.

In some embodiments, where plurality of LIDAR systems (e.g., LIDAR system 200) or scanning units (e.g. scanning units 214) are arranged to provide a greater field of view, as indicated at 458, a first number of LIDAR systems or scanning units that may need to be operated to scan the first functional field of view may be determined.

Returning to 452, if the current vehicle speed is less than the threshold speed, method 450 proceeds to 460. At 460, method 450 includes determining the second functional field of view according to the current vehicle speed. As the vehicle speed is less than the threshold speed, the second functional field of view is narrower than the first functional field of view that is used when the vehicle speed is greater than the threshold speed. Similar to the first functional field of view discussed with respect to step 454, determining the second functional field of view may include determining a second degree of a horizontal field of view according to the current vehicle speed. At lower vehicle speeds less than the threshold speed, when there is sufficient reaction time for the sensor to detect objects travelling into the vehicle path, the functional field of view of the LIDAR sensor is decreased to scan a narrower region including the intended vehicle path and a smaller threshold region surrounding the intended vehicle path. It will be appreciated that a degree of vertical field of view may also be decreased if the arrangement of the deflector units is such that more than one deflector unit is used to scan a greater field of view (when required). Further, as discussed at 454, different speed thresholds may be used to provide a range of field of view widths and heights. Accordingly, in some examples, a look-up table stored in the memory of the processor and including a corresponding field of view (horizontal and/or vertical fields of view) for various vehicle speeds or speed ranges (e.g., 0-20 mph, 20-40 mph, 40-60 mph, etc., or any other speed ranges), may be used for determining the second functional field of view. For example, during vehicle operation, a nominal field of view may be adopted according to the vehicle speed using the look-up table, and thus, the first functional field of view (at step 454) is the nominal field of view for a first vehicle speed and the second functional field of view is the nominal field of view for a second vehicle speed, where the first functional field of view is greater than the second functional field of view and where the first vehicle speed is greater than the second vehicle speed.

In another example, during a first condition, when a current vehicle speed is greater than a threshold speed, a first functional field of view may be used to scan the vehicle path; and during a second condition, when the current vehicle speed is less than the threshold speed, a second functional field of view may be used scan the vehicle path; wherein the first functional field of view is greater than the second functional field of view.

Next at 462, method 450 includes determining a second number of deflectors required to scan the second functional field of view. Since the second functional field of view is narrower than the first functional field of view, the second number of deflectors is less than the first number of deflectors. In some examples, where MEMS mirrors are used as deflectors, as indicated at 463, a second number of MEMS mirrors required to scan the second functional field of view may be determined. In some other examples, as indicated at 464, a second number of LIDAR scanning units or LIDAR systems may be determined according to the second functional field of view.

In one embodiment, a first range of vehicle speeds will be classified as highway vehicle speeds, and a second range of vehicle speeds may be classified as residential area vehicle speeds or parking vehicle speeds, where the first range of vehicle speeds is greater than the second range of vehicle speeds. During vehicle operating conditions, when the vehicle is operating at a first vehicle speed that lies within the first range of vehicle speeds, a first functional field of view may be scanned by operating a first number of deflectors. When the vehicle is operating at a second vehicle speed within the second range of vehicle speeds, the second functional field of view which is narrower than the first functional field of view may be scanned by operating a second number of deflectors less than the first number of defectors. In this way, by adapting the field of view of the LIDAR system according to vehicle speed, during some conditions a number of LIDAR deflectors (or MEMS mirrors or scanning units) used may be reduced. As a result, the respective drivers actuating the unused deflectors may not be powered, and overall power consumption is reduced.

An example change in field of view at different vehicle speeds is illustrated with respect to FIG. 6A.

Upon determining a number of deflectors to scan a determined functional field of view, method 450 proceeds to 466. At 466, method 450 includes determining a curvature of the intended vehicle path through which the vehicle may travel at the current vehicle speed. The curvature of the intended vehicle path may be determined according to input from one or more of a steering angle sensor, one or more cameras, an IMU, and a navigation system.

In one example, the steering angle sensor may provide an indication of a current steering angle of the vehicle. The current steering angle along with a steering ratio and wheelbase distance for the vehicle may be used to determine the curvature of the intended vehicle path. The steering angle is proportional to the curvature of the intended path, and as such the curvature of the intended increases with increase in steering angle. Further, a direction of turn of the steering wheel may be used to determine a direction of turn of the vehicle. Furthermore, in some examples, additionally, input from the navigation system and/or one or more cameras (e.g., front facing camera acquiring vehicle path information) may be used to determine the curvature of the intended path.

In one embodiment, when the vehicle is operating in an autonomous mode, where input from steering angle sensor is not available, information regarding the curvature of the intended vehicle path may be obtained from one or more of the IMU, the navigation system including current vehicle location from a GPS sensor and location information from the navigation system, one or more cameras, and one or more other sensors (e.g., other LIDAR sensors).

Upon determining the curvature of the intended path, method 450 proceeds to 468. At 468, method 450 includes determining if the curvature is greater than the first higher threshold curvature. If the answer at 468 is NO, method 450 proceeds to 472. At 472, method 450 includes determining if the curvature is greater than a second lower threshold. If the curvature is not greater than the second lower threshold (the answer at the 472 is NO), the vehicle is expected to travel in a straight path or a slightly curved path, and accordingly method 450 proceeds to 476. At 476, the method includes operating the vehicle with the determined number of deflectors units according to vehicle speed. In particular, since the curvature of the intended vehicle path is less than the second lower threshold, the intended vehicle path is straight or slightly curved, responsive to which the field of view for the LIDAR system is primarily based on vehicle speed. Accordingly, the LIDAR system may be operated with the number of deflectors units determined according to vehicle speed.

Further due to the curvature of the intended path being less than the second lower threshold, an amount of field of view scanned may be symmetrical with respect to a horizontal axis or a central axis of the vehicle. Said another way, the number of units that are operated may be selected such that the field of view scanned by the number of deflector units is symmetrical with respect to the intended vehicle path. For example, if the number of units are even, a number of units operated on the right side is equal to a number of units operated on the left side. If the number of units is an odd number, a number of units operated on the right side of a central unit are equal to a number of units operated on the left side of the central unit. In this way, the number of deflectors may scan the field of view in a symmetrical manner with respect to the intended vehicle path or the vehicle itself when the intended path is straight or slightly curved.

Similarly, when the number of deflector units operated are reduced, the number of deflector units may be reduced symmetrically from either side. For example, when the vehicle speed changes from a higher vehicle speed above the threshold to a lower vehicle speed below the threshold, and when the intended vehicle path curvature is less than the second lower threshold, the number of deflector units may be reduced from the first number of deflectors units to the second number of deflector units by stopping power supply to the deflector units located at the right and left ends. Thus, when changing the field of view from a wider field of view to a narrower field of view (when the vehicle operation changes from a higher speed above the threshold speed to a lower speed below the threshold speed), a number of units that are turned off may be equal on either sides and may be the end units that scan the out-of-path environment outside the intended vehicle path and outside the threshold region flanking and adjacent to the intended vehicle path.

As another non-limiting example, a first deflector (Dn) may be configured to scan a horizontal field of view ranging from −20° (towards the left side from the drivers point of view) to +200 (towards right side from the drivers point of view). Dn may be centrally positioned so as to scan −20° to +20° with respect to a horizontal or central axis of the vehicle. A second deflector (Dn+1) may be configured to scan a second horizontal field of view ranging from +20° to +60° with respect to the central axis of the vehicle, and a third deflector (Dn+2) may be configured to scan a third horizontal field of view ranging from +60° to +100° with respect to the central axis of the vehicle. Further, a second opposite deflector (Dn−1) may be configured to scan a second opposite horizontal field of view ranging from −20° to −60° with respect to the central axis of the vehicle and a third opposite deflector (Dn−2) may be configured to scan a third opposite horizontal field of view ranging from −60° to −100° with respect to the central axis of the vehicle. When the intended vehicle path is straight or slightly curved, and when the vehicle is operating at low speeds below the threshold speed, the first deflector, the second deflector, and the second opposite deflector may be operated to scan the field of view from −60° to +60° about the central axis of the vehicle. However, when the vehicle is operating at a higher speed at or above the threshold speed, a wider field of view ranging from −100° to +100° maybe used. Accordingly, the first deflector, the second deflector, the second opposite deflector, the third deflector, and the third opposite deflector may be operated scan horizontal field of view from −100° to +100°. Thus, by operating a fewer number of deflectors when the vehicle speed is less than the threshold, electrical power consumption may be reduced. Example functional field of view adjustments according to vehicle speed are illustrated at FIG. 6A.

Step 477 indicates one or more additional deflector unit embodiments that may be adjusted according to the curvature of the intended vehicle path. In one example, when MEMS mirrors are used as deflector units, a number of MEMS mirrors may be adjusted. In another example, a number of scanning units or LIDAR systems may be adjusted.

Returning to 468, if the answer at 468 is YES, method 450 proceeds to 470. At 470, method 450 includes increasing the number of deflector units to increase the field of view in the direction of turn while decreasing the number of defector units in the opposite direction of turn. In one example, the adjustment of field of view may be performed independent of vehicle speed and according to curvature of the intended vehicle path, wherein the curvature is determined according to input from one or more of a steering angle sensor, a navigation system, and one or more cameras (e.g., road facing cameras) acquiring information regarding the vehicle path.

In another example, the adjustment of field of view may be performed with respect to a nominal field of view that is determined according to vehicle speed. As discussed above at 454, 456, 460, and 462, the nominal field of view may be the first functional field of view scanned by the first number deflectors when the current vehicle speed is at or greater than the threshold speed, and nominal field of view may be the second functional field of view scanned by the second number of deflectors when the vehicle speed is lower than the threshold speed. When the curvature of the intended vehicle path is steep (greater than the first higher threshold), the field of view is increased in the direction of turn with respect to nominal field of view. Increasing the field of view in the direction of turn may be enabled by increasing a number of deflector units that are configured to scan the field of view in the desired direction. As a non-limiting example, if half of the first number deflectors is used to scan a right side of the first field of view (e.g., to the right of a central axis of the vehicle) and the second half of the first number of deflectors is used to scan a left side of the first field of view, when the curvature of the intended vehicle path is to the right is and is greater than the first threshold, one or more additional number of deflectors (in addition to half of the first number of deflectors) may be used to scan a greater region in the direction of turn (that is, to the right) and at the same time, one or more deflectors scanning the left side (e.g., deflectors scanning the left-most regions) that do not cover scanning of intended vehicle curved path and the threshold regions may be turned off to conserve electrical power or in some examples, operated in a low-power mode. Thus, in some examples, operating the number of units for scanning the field of view in the direction of turn may include operating the units that are not normally powered on for the current vehicle speed. Further, in addition to increasing the field of view in the direction of turn, one or more deflector units that are configured to scan the field of view in an opposite direction (e.g., farthest region to the opposite direction) may not be operated. Thus, scanning in a direction opposite to the direction of turn may be decreased by not operating one or more deflector units that normally scan field of view in the opposite side of turn.

As another non-limiting example, referring to the example discussed at step 476, a first deflector may be configured to scan −20° to +20° with respect to a horizontal or central axis of the vehicle, a second deflector may be configured to scan a second horizontal field of view ranging from +20° to +60° with respect to the central axis of the vehicle, and a third deflector may be configured to scan a third horizontal field of view ranging from +60° to +100° with respect to the central axis of the vehicle. Further, a second opposite deflector may be configured to scan a second opposite horizontal field of view ranging from −20° to −60° with respect to the central axis of the vehicle and a third opposite deflector may be configured to scan a third opposite horizontal field of view ranging from −60° to −100° with respect to the central axis of the vehicle. When the intended vehicle path is straight or slightly curved, and when the vehicle is operating at low speeds below the threshold speed, the first deflector, the second deflector, and the second opposite deflector may be operated to scan the field of view from −60° to +60° about the central axis of the vehicle. Further, due to low vehicle speed, the field of view is narrow (−60° to +60°) compared to a wider field of view that may be used (−100° to +100°) when the vehicle speed is higher than the threshold speed. Since the first, second, and the second opposite deflectors cover scanning of the desired field of view (−60° to +60°) at the low vehicle speed, the third deflector and the third opposite deflector may be turned off. While operating at the low speeds below the threshold, the vehicle driver may turn the steering wheel at a steep angle to the right responsive to which the intended vehicle path may be determined to have a curvature greater than the first higher threshold. In response to the increase in the curvature of the intended vehicle path in the right direction, the first deflector, the second deflector, and the third deflector (which is not normally on when the vehicle is travelling in a straight path or slightly curved path) may be operated to scan a horizontal field of view from −20° to +100° while the second opposite deflector may be turned off. The first second and the third deflectors may cover scanning of the curved vehicle path in the direction of the curve as well as scan the threshold region surrounding the curved vehicle path. The second opposite deflector that scans a field of view in an opposite direction of turn may be turned off to reduce current drain. Similarly, when the vehicle driver intends to make a steep left turn and the curvature of the intended vehicle path is greater than the first higher threshold, the first, the second opposite, and the third opposite deflectors may be operated to cover a field of view ranging from −100° to +20°, while the second and third deflector that normally scan the opposite side may be turned off to conserve electrical power that may otherwise be consumed due additional ASIC and detection processing for the second and the third deflector units.

Continuing with the example above, when the vehicle is traveling at higher speeds greater than the threshold speed, a wider field of view ranging from −100° to +100° may be used. As such, the first, the second, the second opposite, the third, and the third opposite deflectors may be operated to scan the wider field of view the higher speed. When the intended vehicle path as a curvature (to the right) greater than the first higher threshold, and overall wider field of view may be maintained while adjusting that directionality of the field of view toward the direction of turn. Accordingly, the first, the second, the second opposite, and the third deflectors may be operated to provide scanning of −60° to +100°. Further, a fourth deflector (Dn+3) that is not normally operated when travelling in straight path or slight curved path at higher speeds may be turned on to scan +100° to +140° in the direction of turn (towards right) while the third opposite deflector (scanning −60° to −100° in the opposite direction of turn) may be turned off to reduce power consumption. It will be appreciated that the above indicated number of deflectors and field of view ranges are for illustrative purposes, and any number of deflectors and any field of view range for each deflector may be used and are within the scope of the disclosure. Step 471 indicates one or more additional deflector unit embodiments that may be adjusted according to the curvature of the intended vehicle path. In one example, when MEMS mirrors are used as deflector units, a number of mems mirrors may be adjusted to increase the field of view the direction of turn by decreasing the field of view in the opposite direction turn as discussed above. In another example, when multiple scanning units or multiple LIDAR systems are used, the control strategy discussed above to increase the field of view in the direction of turn by increasing the number of units in the direction of turn and decrease the field of view in the opposite direction of turn by decreasing the number of units the opposite direction turn may be implemented for the plurality of scanning units or LIDAR systems.

Returning to 472, if the curvature is less than the first higher threshold but greater than the second lower threshold, method 450 proceeds to 474. At 474, method 450 includes maintaining a number of deflector units in the direction of the turn to maintain a turn side field of view in the direction of turn, and decreasing number of deflector units in the opposite direction of turn to decrease an opposite side field of view in the direction opposite to turn. In one example, the adjustment of field of view may be performed independent of the vehicle speed and according to curvature of the intended vehicle path. Accordingly, in one example, when the curvature is less (greater than the second lower threshold and less than the first higher threshold) a number of units scanning a field of view in the direction of turn may be less than a number of units scanning the field of view in the direction of turn when the curvature is at or greater than the first higher threshold. Additionally or alternatively, when the curvature is less, a number of units farthest to the opposite direction of turn that are powered off may be less than when the curvature is greater than the first higher threshold.

In another example, the adjustment of field of view may be performed with respect to a nominal field of view, and hence, with respect to the nominal number of deflectors, the nominal number determined according to vehicle speed. As a non-limiting example, if half of the first number deflectors (scanning first field of view according to vehicle speed) is used to scan a right side of the first field of view t (e.g., to the right of a central axis of the vehicle) and the second half of the first number of deflectors is used to scan a left side of the first field of view, when the curvature of the intended vehicle path is to the right is at or greater than the second lower threshold but less than the first higher threshold, operation of the right half of the deflectors scanning the right side of the first field of view may be maintained and at the same time, one or more deflectors scanning the left side (e.g., deflectors scanning the left-most regions) that do not cover scanning of intended vehicle curved path may be turned off to conserve electrical power or in some examples, operated in a low-power mode. As another non-limiting example, continuing with the example discussed with respect to 470, when the vehicle speed is less than the threshold speed, the first deflector, the second deflector, and the second opposite deflector may be operated to scan a horizontal field of view ranging from −60° to +60°. When the vehicle driver turns the steering wheel to the right to direct the vehicle in a curved path, the intended vehicle path may have a curvature corresponding to the steering angle. Responsive to a curvature of the intended vehicle path to the right being at or greater than the first threshold and less than the second threshold, operation of the first deflector and the second deflector may be maintained while the second opposite deflector may be turned off. In some examples, if the second opposite deflector scans a portion of the threshold region surrounding the intended vehicle path, then the operation of all three deflectors may be maintained. When the vehicle is operating at a higher speed greater than the threshold speed, the first deflector, the second deflector, the second opposite deflector, the third deflector, and the third opposite deflector may be operating to provide scanning of a horizontal field of view ranging from −100° to +100°. When the vehicle operator turns the steering wheel to the right and if the intended vehicle path has a curvature greater than the first threshold and less than the second threshold, operation of the first deflector, the second deflector, and the third deflector may be maintained while one or more of the second opposite deflector and the third opposite deflector may be turned off.

In this way, power consumed by the operation of the one or more deflectors that do not cover scanning of vehicular path and a threshold region surrounding the vehicular path may be reduced. Step 475 indicates one or more additional deflector unit embodiments that may be adjusted according to the curvature of the intended vehicle path. In one example, when MEMS mirrors are used as deflector units, a number of mems mirrors may be adjusted to maintain the turn side field of view the direction of turn and decreasing the field of view in the opposite direction turn as discussed above. In another example, when multiple scanning units or multiple LIDAR systems are used, the control strategy discussed above to maintain the field of view in the direction of turn by maintaining the number of units in the direction of turn and decrease the field of view in the opposite direction of turn by decreasing the number of units the opposite direction turn may be implemented for the plurality of scanning units or LIDAR systems.

In this way, operation of a LIDAR system mounted on to the vehicle may be adjusted according to vehicle speed and curvature of the intended vehicle path.

In one embodiment, all the deflector units may be operated to illuminate the vehicle operating environment, and a number of deflector units and corresponding positions of the number of deflector units that illuminate out-of-path environment (that is, environment outside of the intended vehicle path and outside of the threshold region surrounding the intended vehicle path) may be determined, and data acquired from the number of deflector units scanning the out-of-path environment may not be used for processing by the LIDAR processing unit. In this way, computational work load may be reduced.

FIG. 5 shows a table 500 indicating example adjustments of a functional field of view of a LIDAR system, such as LIDAR system 200 shown at FIG. 2B, including a plurality of MEMS mirrors, during various vehicle operating conditions. Table 500 describes example adjustments that may be performed by a vehicle processor in conjunction with a LIDAR system processor to increase or decrease a field of view of the LIDAR system by powering on or turning off power supply to one or more MEMS mirrors of the LIDAR system and/or actuators of the MEMS mirrors. In particular, a number of MEMS mirrors that are operated may be adjusted according to a calculated vehicle path in order to decrease overall LIDAR sensor power consumption and computational workload. The plurality of MEMS mirrors are operated as deflectors for scanning an environment surrounding the vehicle including a vehicle travelling path. In one example, the plurality of MEMS mirrors may be arranged as M×N array, where M in the number of row and N is the number of columns. Each of the plurality of MEMS mirrors may scan an individual field of view using light from at least one light source such that the plurality of MEMS mirrors may together provide scanning of a greater field of view. The individual field of view of each MEMS mirror may be contiguous or overlapping with an adjacent mirror. This example will be described using a single row comprising an even number of MEMS mirrors (that is, 1×N array, where N is an even number). It will be noted that the adjustment of field of view and therefore, the adjustment of MEMS mirrors, described herein may be applicable to any configuration of MEMS mirrors. Further, while the present example is described with respect to MEMS mirrors, the adjustment of field of view and operation of the MEMS mirrors may be used for any type of deflector units, particularly, when a plurality of deflector units are used for scanning a greater field of view, for example.

Further, the table 500 describes example adjustments for the LIDAR sensor system that may be positioned so as to scan a total field of view that spans across an a front of the vehicle. For example, the LIDAR system may be positioned within a grille at the front of the vehicle, and may be configured to scan the total field of view across the front with the plurality of MEMS mirrors; wherein each MEMS mirror of the plurality of MEMS mirrors scans a respective portion of the total field of view, and wherein the respective portions scanned by two adjacent MEMS mirrors may be contiguous or overlapping. While the table 500 includes example descriptions of the adjustments that may be performed by the processor, in one example, table 500 may be stored as a look-up table in a memory of a processor. The look-up table may include values for the number of MEMS mirrors that are powered on as well as position indications regarding which MEMS mirror is operated and which MEMS mirror is powered off. The LiDAR system processor may perform field of view adjustments by powering specified MEMS units and stopping operation of specified MEMS units according to the look-up table.

Table 500 shows a calculated vehicle path at column 502. The calculated vehicle path (also referred to herein as intended vehicle path) may be determined according to input from one or more of a steering angle sensor, a navigation system, and one or more cameras acquiring information surrounding the vehicle. Table 500 further shows a vehicle speed determined according to the vehicle speed sensor at column 504, a steering angle determined according to the steering angle sensor at column 506, a lane change indication according to a lane change indicator at column 508, a desired functional field of view (also referred to as desired field of view) of the LIDAR system corresponding to the calculated vehicle path at column 510, and a number of MEMS mirrors that are electrically powered to provide the desired field of view at column 512. In this example, the desired field of view (FoV) is a horizontal field of view, and thus the vertical field of view may remain the same for the various vehicle paths while the horizontal field of view is adjusted. However, in some examples, additionally, the plurality of MEMS mirrors may be arranged to provide a greater vertical field of view, and in such examples, one or more MEMS mirrors (e.g., one or more rows of MEMS mirrors) may be powered or unpowered to increase or decrease the vertical field of view. Further, in this example, a number of right MEMS mirrors (also referred to herein as right units) may be configured to cover scanning of a right field of view, where the right field of view is a right sector to a right side (from view point of the vehicle operator) of a central axis of the vehicle, and a number of left units (also referred to herein as left units) may be configured to cover scanning of a left field of view, where the left field of view is a left sector to a left side of a central axis of the vehicle. Directional adjustment of the MEMS mirrors (e.g., whether right units or left units or both are adjusted) according to a calculated direction of the vehicle path is indicated at column 514.

Row 520 shows example adjustment of the MEMS mirrors when the vehicle is at an intersection or is approaching or passing the intersection section. For example, one or more front the facing cameras may detect a traffic sign (e.g., a traffic light pole) ahead of the vehicle, which may indicate that the vehicle is approaching an intersection. Additionally or alternatively, the navigation system may provide information regarding an approaching intersection. Further, the vehicle processor may determine that the vehicle is stopped at an intersection using information from the vehicle speed sensor. When the vehicle is at the intersection or is approaching the intersection or is passing the intersection, full field of view of the LiDAR sensor may be utilized independent of the vehicle speed, steering angle, and lane change indication. Accordingly, all of the plurality of MEMS mirrors are powered on, and thus, all of the right units and all of the left units are operated. Further, at vehicle start-up (e.g., change in ignition key position from OFF to ON) a full field of view of the LIDAR system may be used. In one example, at vehicle start-up, a diagnostic operation to evaluate operation of the LIDAR systems may be performed, and as such a full field of view of the LIDAR sensor may be used at start-up.

In one embodiment, when a plurality of LIDAR systems are used for scanning an environment surrounding the vehicle, all of the plurality of LIDAR systems, including front path facing LIDAR systems, rear path facing LIDAR systems, right and left side areas facing LIDAR systems, may be operated.

Rows 522, 524, and 526 depict adjustment of MEMS mirrors when the calculated vehicle path straight or slightly curved (e.g., curvature of the vehicle path is less than the second lower threshold at step 472 at FIG. 4B) responsive to the steering angle being less than a lower threshold angle. During vehicle operating conditions when the vehicle path straight or slightly curved, the desired field of view is adjusted according to vehicle speed. Accordingly, when the vehicle speed is less than a threshold speed (e.g., threshold speed discussed at step 452 at FIG. 4B), a narrow field of view may be desired (row 522), and as such a number of MEMS mirrors operated may be decreased by stopping sensing with one or more MEMS mirrors (e.g., stopping electrical power to one or more MEMS mirror units and/or stopping actuation of one or more MEMS mirrors). Since the vehicle path is straight, a number of right units that are not operated may be equal to a number of left units that are not operated such that the field of view of the LIDAR system is reduced symmetrically and proportionally from both right and left margins of the total field of view. The narrow field of view may cover scanning of the calculated or intended vehicle path as well as a narrow threshold region surrounding the vehicle path so as to detect in-path objects and some areas directly adjacent to the calculated vehicle path.

When the vehicle speed is greater than the threshold speed (row 524), a wider field of view is desired and as such, and number of MEMS mirrors that are operated may be less than or equal to the total number of MEMS mirrors, but greater than the number of MEMS mirrors used for a narrower field of view in the same operating environment. Further, due to a relatively straight intended vehicle path, if the field of view is changed from a narrower field of view to a wider field of view, an increase in the number of mems mirrors operated may be symmetrical on both sides so as to symmetrically increase the right and the left margins of field of view. Similarly, if the field of view is changed from a total field of view to a wider field of view that is smaller than the total field of view, a number of right and left units not operated to obtain the wider field of view may be symmetrical. In this way, when the vehicle path is straight or only slightly curved, adjustment to the right sector of the total field of view and the left sector of the total field of view will be performed symmetrically.

Further, when the calculated vehicle path straight or only slightly curved, if the vehicle operator provides an indication of lane change (row 526, column 508), the nominal field of view (according to the vehicle speed) may be further adjusted so as to increase the field of view in the direction of indication. Accordingly, when the vehicle operator provides the right indication or when a map identifies a directional turn/curve in the road, a number of right mems mirrors operated may be increased while a number of left mems mirrors may remain the same, and vice-versa. After completion of lane change, the field of view may be changed back to the nominal field of view (that is, according to vehicle speed).

Row 528 depicts example adjustment when the steering angle is greater than the lower threshold but less than a higher threshold angle and as such, the curvature of the calculated vehicle path is greater than the lower threshold but less than a higher threshold (e.g., first higher threshold at step 468). In some examples, curvature of the calculated vehicle path may be determined according to one or more of steering angle sensor and/or IMU (e.g., yaw rate, roll angle, pitch angle, heading, acceleration, etc.). In response to the calculated vehicle path being curved, a field of view of the LIDAR system may be adjusted to decrease a portion of field of view in a direction opposite to the turning direction. Accordingly, when the intended vehicle path is curving to the right (row 528, column 514), a number of left mirrors that are powered may be reduced while a number of right mirrors that are operated may be maintained (e.g., according to vehicle speed). Similarly when the intended vehicle path is curving to the left (row 528, column 514), a number of right mirrors that are powered may be reduced while a number of left mirrors that are operated may be maintained according to the vehicle speed, for example.

Row 530 shows example adjustments when the steering angle is greater than the higher threshold angle and therefore, the calculated vehicle path has a steep curvature greater than the first higher threshold (e.g., the first higher threshold at 468 at FIG. 4B). In response to the calculated vehicle path having a steep curvature, a portion of field of view may be increased in the turning direction while a portion of field of view may be decreased in the direction opposite to the turning direction. Accordingly, when the intended vehicle path has a steep curve to the right (row 530, column 514), a number of right MEMS mirrors that are operated may be increased to increase a portion of field of view in the turning direction, and a number of left MEMS mirrors that are operated may be decreased to decrease a portion of field of view in the direction opposite to the turning direction. Similarly, when the intended vehicle path has a steep curve to the left (row 530, column 514), a number of left MEMS mirrors that are operated may be increased to increase a portion of field of view in the direction of turning while a number of right MEMS mirrors that are operated will be decreased to decrease a portion of the field of view in the direction opposite to the turning direction.

Row 532 shows example adjustment during transient maneuvers, such as during a tip-in (increased torque request by operator, for example). During transient conditions, field of view may be adjusted to provide full field of view, and as such all MEMS units may be operated. Upon completion of the transient maneuver, the field of view may be adjusted according to one or more of vehicle speed, intended vehicle path, and vehicle external operating environment as discussed above.

It will be appreciated that the vehicle path may be continuously evaluated and the field of view may be continuously adjusted according to the intended vehicle path. For example, upon completion of the turn, if the vehicle resumes a straight path, the LIDAR system may be operated with the nominal field of view corresponding to the vehicle speed. In this way, dynamically adjusting field of view of sensor, electrical power consumed by the LIDAR sensor for driving MEMS mirror operation and computational processing may be reduced. This, in turn, reduces overall power consumed from a vehicle power source, and may improve an overall driving range of an electrically powered or partially electrically powered vehicle.

In some embodiments, while all the MEMS mirrors are operated to illuminate the environment, data acquired by the MEMS mirrors may be selectively processed. For example, selected data acquired by a desired number and position of MEMS mirrors that scan the intended vehicle path and/or the threshold region surrounding the intended vehicle path may be processed. In this way, computation workload as well as processing times of the LIDAR system is reduced. Also, power consumption is reduced due to decreased computational load.

FIGS. 6A-6C illustrate example field of view adjustments according to vehicle speed and intended vehicle path by adjusting operation of one or more mirrors in a LIDAR sensor 610, which may be an example of LIDAR sensor system 200 discussed at FIG. 2B. LIDAR sensor 610 may be disposed at a front of a vehicle, such as vehicle 100 at FIG. 1A, and may include a first mirror having a first field of view 601, a second mirror having a second field of view 602, a third mirror having a third field of view 603, a fourth mirror having a fourth field of view 604, a fifth mirror having a fifth field of view 605, and a sixth mirror having a sixth field of view 606. The first, second, and third mirrors cover scanning of a right region to the right side (from point of view of a vehicle operator or with respect to looking forward in the direction of travel) of a central axis 611 of the vehicle. The fourth, fifth, and sixth mirrors cover scanning of a left region to the left side (from point of view of a vehicle operator or with respect to looking forward in the direction of travel) of the central axis 611. In FIGS. 6A-6C, a region scanned by a mirror when it is operated (electrically powered) is shown with solid line borders while a region not scanned by the mirror due to the mirror not being electrically powered (that is, the mirror is not scanning the field of view, or said another way, illuminating objects within field of view) is shown with dashed borders.

LIDAR sensor 610 may receive a vehicle speed indication 612 and intended vehicle path indication 614 from in-vehicle computing system 109 or via a vehicle control system, such as vehicle control system 190. As discussed above the vehicle speed indication 612 may be obtained via a vehicle speed sensor and the intended path indication 614 may be determined according to one or more a steering angle sensor, a vehicle location sensor, one or more cameras acquiring information regarding the exterior environment of the vehicle, one or more additional LIDAR sensors, and a navigation sensor. In some examples, a processor of the LIDAR sensor 610 may calculate an intended vehicle path using indications from one or more of the steering angle sensor, vehicle location sensor, one or more cameras, one or more additional LIDAR sensors, and navigation sensor.

Turning now to FIG. 6A, an example field of view adjustment 600 is shown when the vehicle speed is at or greater than a threshold speed on an intended vehicle path 609, which is a straight path (that is, an intended turning radius of the vehicle is less than a lower threshold). For example, the vehicle may be traveling on a highway and therefore, may be operating at a higher vehicle speed, and may be travelling on a straight path 609. In order to ensure sufficient reaction time for the LIDAR sensor 610 to detect objects traveling into the vehicle path a wider field of view 616 may be used when the vehicle speed is at or above the threshold speed. Further, since the vehicle is expected to travel in a straight path field of view may be symmetrical with respect to the central axis 611 of the vehicle. Accordingly, a number of right mirrors operated is equal to a number, of left mirrors operated. Thus, in order to scan the wider field of view 616, the second, the, and the fifth mirrors are operated with electrical power to scan the intended vehicle path 609 and a threshold region symmetrically on right and left sides of the intended vehicle path 609. Further, the first mirror (configured to scan field of view 601) and the sixth mirror (configured to scan field of view 606) scanning the extreme right and left regions respectively may be unpowered. The extreme right and the left regions are out-of-path regions that are not scanned by the mirrors and are shown in dashed lines.

FIG. 6A also shows an example field of view adjustment 620 for the LIDAR sensor 610 when the vehicle speed is less than the threshold speed. For example, the vehicle will be operating in a local driving environment and therefore, the vehicle speed may be lower. Further, intended vehicle path 629 is a straight path. When the vehicle speed is less than the threshold speed and the intended vehicle path 629 is straight, a narrower field of view 626 is adapted to conserve electrical power. Accordingly the third and the fourth mirrors that scan the intended vehicle path 629 and a second threshold region (which may be less than the threshold region when the speed is greater) flanking and directly adjacent to the intended vehicle path 629 are powered, while the remaining mirrors (the first, the second, the fifth, and the sixth) that scan out-of-path environment are not powered. Further, scanning of the intended vehicle path is symmetrical with respect to a central axis of the vehicle due to the intended travel path being straight. Thus, a number of mirrors operated to scan a right field of view, which is to a right side of central axis 611 from operator's point of view, is equal to a number of mirrors operated to scan the left field of view, which is to a left side of central axis 611 from operator's view point.

In some examples, in addition to the vehicle speed and the intended vehicle path, an amount of vehicular and/or non-vehicular traffic may be monitored (e.g., via one or more cameras scanning the vehicle environment, one or more other LIDAR sensors, one or more other sensors that monitor the vehicle environment), and responsive to the amount of traffic greater than a threshold, the field of view 626 may be increased.

FIG. 6B shows an example field of view adjustments 630 and 640 for the LIDAR sensor 610 when the intended vehicle path has a curvature greater than the lower threshold and less than a higher threshold. The curvature may be inferred from the degree of turn sensed from steering angle sensor, for example. Additionally or alternatively, input from one or more of the vehicle navigation system, cameras acquiring information regarding the vehicle environment, and other imaging and ranging sensors may be used to determine the curvature of the intended vehicle.

At 630, the intended vehicle path 639 turns towards the left (from point of view of a vehicle operator or with respect to direction of travel looking forward into intended vehicle path). Responsive to the curvature to the left of the intended vehicle path 639, the first mirror and the second mirror scanning rightmost regions that are out-of-path regions is not be operated (that is, not electrically powered) while the third, fourth, and fifth mirrors scanning the intended vehicle path and regions flanking and directly adjacent to the intended vehicle path is operated (that is, electrically powered) to scan field of view 636. Further, the sixth mirror scanning the leftmost region that is out-of-path and not within the intended vehicle path or within a flanking region directly adjacent to the intended vehicle path is not operated. In this way, one or more mirrors that scan out-of-path environments that are not within the intended vehicle path or within a flanking region directly adjacent to the intended vehicle path are not operated. In particular, a greater number of mirrors that scan an opposite out-of-path environment, in a direction opposite to the turning direction, are not operated while a fewer (or none depending on the degree of curvature) number of mirrors that scan out-of-path objects in the turning direction are not operated. Thus, a number of mirrors that are operated are reduced, which reduces electrical power consumption, and computational workload on the LIDAR processor and/or vehicle processor that is used to generate depth maps is reduced.

Further, as illustrated at 640, the intended vehicle path 649 turns to the right, and as such, the fifth and the sixth mirror scanning the leftmost out-of-path environment and the first mirror scanning the rightmost out-of-path environment are not operated while the second, third, and fourth mirrors scanning the intended vehicle path 649 and a threshold region surrounding the intended vehicle path 649 are operated to scan within field of view 646.

Further, example field of view adjustments 650 and 660 for the LIDAR system 610 when the curvature of the intended vehicle path is greater than the higher threshold (steep curve) are shown at FIG. 6C. Due to greater curvature of the intended vehicle path, a greater number of mirrors that scan out-of-path environment in a direction opposite to the turning direction are not operated while one or more additional mirrors in the turning direction are operated to cover scanning of the intended vehicle path and a threshold region flanking and directly adjacent to the intended vehicle path. In particular, at 650, the intended vehicle path 659 curves to the left, and as such, the first, second, and third mirrors that scan regions to in the right side are not operated while fourth, fifth, and sixth mirrors are operated to scan within field of view 657. The sixth mirror (scanning field of view 606) may not be normally operated; however due to the steep curvature of the intended vehicle path, the sixth mirror may be operated to scan the leftmost region within field of view 606. Similarly, at 660, the intended vehicle path 669 turns to the right, and responsive to the curvature being greater than the higher threshold, the first, second, and third mirrors are operated to scan within field of view 667 while the fourth, fifth, and sixth mirrors are not operated since they scan out-of-path environment in the direction opposite to the turning direction.

Here again, by reducing the number of mirrors to sense the environment, power consumption and computational workload is improved.

Further, in some embodiments more than one LIDAR sensor may be operated. For example, a second LIDAR sensor mounted to a right side of sensor 610 and a third LIDAR sensor mounted to a left side of sensor 610 may be utilized for scanning the environment. In such examples, the second and third LIDAR sensors may be controlled in a manner similar to sensor 610. As a result, while there may be some overlap in the regions scanned by the different LIDAR units, high level of redundancy in LIDAR scanning may be reduced, which results in improved power management and computational resource management.

In one embodiment, the first field of view 601, second field of view 602, third field of view 603, fourth field of view 604, fifth field of view 605, and sixth field of view 606 may be scanned by a first, second, third, fourth, fifth, and sixth LIDAR systems. In some examples, the first to sixth LIDAR systems may be configured as scanning LIDAR systems (e.g., LIDAR system 200 at FIG. 2A or 2B), or non-scanning LIDAR systems, such as flash LIDAR systems. In some examples, a combination of scanning and non-scanning LIDAR systems may be used. The above-described adjustment and controls of the mirrors, deflector units, or MEMS mirror of the LIDAR systems may be implemented with respect to the whole LIDAR systems or any type of LIDAR systems (scanning, flash, etc.) without departing from the scope of the disclosure. Further, while the example above is described using six mirrors/units, the adjustment and control described above may be implemented with any number of mirror/units or LIDAR systems without departing from the scope of the disclosure.

As shown in FIGS. 1A, 1B, 2A, and 2B-3, a LIDAR system according to the present disclosure may be part of a vehicle, and methods 300, 400, and 450 according to the present disclosure may be carried out via an in-vehicle computing system, a processor of the LIDAR system or a combination thereof.

The description of embodiments has been presented for purposes of illustration and description. Suitable modifications and variations to the embodiments may be performed in light of the above description or may be acquired from practicing the methods. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, etc. The described methods and associated actions may also be performed in various orders in addition to the order described in this application, in parallel, and/or simultaneously. Further, the described methods may be repeatedly performed. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for a sensor for imaging and ranging comprising:
adjusting a field of view of the sensor by changing a number of Micro-Electro-Mechanical Systems (MEMS) mirrors of the sensor that are powered according to at least one of: a comparison of a vehicle speed to a threshold speed; and a comparison of an intended vehicle path to a threshold degree of curvature;
wherein when powered, MEMS mirrors of the number of MEMS mirrors illuminate objects within the field of view using light from one or more light sources;
wherein MEMS mirrors of the sensor that are not powered have a field of view that covers regions that are not within the intended vehicle path; and
wherein the sensor is disposed on a vehicle and scans an exterior environment of the vehicle within the field of view.

2. The method of claim 1, further comprising:
wherein the vehicle speed is from a vehicle speed sensor.

3. The method of claim 1, further comprising:
responsive to the vehicle speed being greater than the threshold speed, increasing the number of MEMS mirrors of the sensor that are powered; and
responsive to the vehicle speed being less than the threshold speed decreasing the number of MEMS mirrors of the sensor that are powered.

4. The method of claim 1, further comprising:
adjusting processing of sensor data according to the changed number of MEMS mirrors of the sensor that are powered,
wherein the processing of sensor data is increased with an increase in the number of MEMS mirrors of the sensor that are powered; and
wherein the processing of sensor data is decreased with a decrease in the number of reflective units MEMS mirrors of the sensor that are powered.

5. The method of claim 1, wherein the intended vehicle path is determined according to one or more of an indication from a steering angle sensor, an onboard inertial measurement unit, a vehicle location sensor, one or more cameras acquiring information regarding the exterior environment of the vehicle, one or more additional imaging and ranging sensors, a navigation sensor, and expected vehicle path features according to input from a map received from a navigation satellite system.

6. The method of claim 1, further comprising:
responsive to a degree of curvature of the intended vehicle path being greater than the threshold degree of curvature in a first direction, stopping electrical power supply to a second number of MEMS mirrors while electrically powering a remaining number of MEMS mirrors, the second number of MEMS mirrors scanning a region opposite to the first direction and the region not including the intended vehicle path and a threshold region adjacent to and flanking the intended vehicle path; and
responsive to the degree of curvature of the intended vehicle path being less than the threshold degree of curvature, changing the number of MEMS mirrors of the sensor that are powered according to the vehicle speed.

7. The method of claim 1, wherein the sensor is a LIDAR sensor.

8. The method of claim 7,
wherein the one or more light sources are laser devices.

9. The method of claim 1, wherein adjusting the field of view includes adjusting one or more of a horizontal field of view of the sensor and adjusting a vertical field of view of the sensor.

10. A method, comprising:
adjusting a field of view of a LIDAR sensor mounted to a vehicle according to a number of mirrors among a plurality of mirrors of the LIDAR sensor, the number of mirrors being arranged as an array of mirrors with a number M of rows and a number N of columns, and the number of mirrors operated to scan an external environment of the vehicle;
wherein the number of mirrors is determined according to one or more of a vehicle speed and an intended vehicle path; and
responsive to the vehicle speed being greater than a threshold speed, adjusting the field of view to a wider field of view by operating a first number of mirrors of the array of mirrors, and not operating remaining mirrors of the array of mirrors; and
responsive to the vehicle speed being less than the threshold speed, adjusting the field of view to a narrower field of view by operating a second number of mirrors of the array of mirrors, and not operating remaining mirrors of the array of mirrors,
wherein the first number of mirrors is greater than the second number of mirrors.

11. The method of claim 10, wherein adjusting the field of view includes selectively processing sensor data acquired via the number of mirrors.

12. The method of claim 10, further comprising:
responsive to a curvature of the intended vehicle path being less than a lower threshold, operating a third number of mirrors to scan a desired field of view of the LIDAR sensor according to the vehicle speed; and
when the vehicle is operating at the vehicle speed and responsive to the curvature of the intended vehicle path being greater than the lower threshold and less than a higher threshold, not supplying electrical power to a first portion of the third number of mirrors while supplying electrical power to a remaining portion of the third number of mirrors, the first portion of the third number of mirrors scanning an out-of-path external environment of the vehicle in a direction opposite to a turning direction of the curvature of the intended vehicle path.

13. The method of claim 12, further comprising:
when the vehicle is operating at the vehicle speed and responsive to the curvature of the intended vehicle path being greater than the higher threshold, not supplying electrical power to a second portion of the third number of mirrors while supplying electrical power to a fourth number of mirrors, the fourth number of mirrors including a second remaining portion of the third number of mirrors and one or more additional mirrors scanning an in-path external environment in the turning direction;
wherein the second portion of the third number of mirrors scan a second out-of-path external environment of the vehicle is the direction opposite to the turning direction; and
wherein the second portion is greater than the first portion.

14. The method of claim 10,
wherein the mirrors are MEMS mirrors; and
wherein adjusting the field of view includes selectively actuating the number of mirrors.

15. The method of claim 10, wherein the intended vehicle path is determined according to one or more of a steering angle sensor, a vehicle location sensor, one or more cameras acquiring information regarding an exterior environment of the vehicle, one or more additional imaging and ranging sensors, an inertial measurement sensor, and a navigation sensor.

16. The method of claim 10, wherein when the number of mirrors of the array of mirrors being operated is adjusted, the number of mirrors of the array of mirrors being operated is symmetrical with respect to an axis of the vehicle.

17. A system comprising:
a computing system of a vehicle;
a LIDAR sensor system coupled to the vehicle and including a processor communicatively coupled to the computing system, a plurality of Micro-Electro-Mechanical Systems (MEMS) mirrors for scanning within a field of view of the LIDAR sensor system, the plurality of MEMS mirrors being arranged as an array of MEMS mirrors with a number M of rows and a number N of columns, and one or more MEMS mirror drivers communicatively coupled to the processor;
a plurality of sensors communicatively coupled to the computing system, the plurality of sensors including a vehicle speed sensor and a steering angle sensor; and a storage device storing instructions executable by the processor to:
  determine an intended vehicle path according to one or more of a steering angle indication from the steering angle sensor and a vehicle speed indication from the vehicle speed sensor;
  adjust the field of view according to the intended vehicle path;
  wherein the field of view is adjusted by changing a number of MEMS mirrors that are powered, and
  reduce a number of MEMS mirrors operated responsive to an increase in curvature of the intended vehicle path above a threshold degree of curvature, including:
    stopping electrical power to one or more MEMS mirrors scanning an out-of-path environment that does not include a desired field of view, the out-of-path environment being in a direction opposite to a turning direction of the vehicle along the intended vehicle path,
    while powering a number of MEMS mirrors that scan the desired field of view, the desired field of view including the intended vehicle path and a threshold region flanking and directly adjacent to the intended vehicle path,
    wherein of the number of MEMS mirrors operated responsive to the increase in curvature of the intended vehicle path above the threshold degree of curvature, a number of right-side mirrors of the array of MEMS mirrors may be different than a number of left-side mirrors of the array of MEMS mirrors.

18. The system of claim 17, wherein actuation of the number of MEMS mirrors that are powered is individually controlled via the one or more MEMS mirror drivers.

19. The system of claim 17, wherein the storage device contains further instructions executable by the processor to:
  reduce a number of MEMS mirrors operated responsive to a decrease in vehicle speed below a threshold speed, including:
    stopping electrical power to an equal number of MEMS mirrors that scan out-of-path environments on both sides outside of the desired field of view,
    while powering the number of MEMS mirrors that scan the desired field of view, the desired field of view including the intended vehicle path and the threshold region flanking and directly adjacent to the intended vehicle path.

* * * * *

UNITED STATES PATENT AND TRADEMARK OFFICE
CERTIFICATE OF CORRECTION

Page 1 of 1

PATENT NO. : 12,105,222 B2
APPLICATION NO. : 17/102212
DATED : October 1, 2024
INVENTOR(S) : Kevin Dunn and Dan DeClerck It is certified that error appears in the above-identified patent and that said Letters Patent is hereby corrected as shown below:

In the Claims

In Claim 4:
Column 35, Line 9, remove "reflective units" before "MEMS mirrors"

Signed and Sealed this
Twenty-sixth Day of November, 2024

Katherine Kelly Vidal
*Director of the United States Patent and Trademark Office*